United States Patent
Beyhaghi et al.

(10) Patent No.: US 9,612,601 B2
(45) Date of Patent: Apr. 4, 2017

(54) SYSTEMS AND METHODS FOR ADAPTIVE CAPACITY CONSTRAINT MANAGEMENT

(71) Applicant: Johnson Controls Technology Company, Holland, MI (US)

(72) Inventors: Saman Beyhaghi, Hartford, WI (US); Matthew J. Asmus, Watertown, WI (US); Justin P. Kauffman, York, PA (US)

(73) Assignee: Johnson Controls Technology Company, Holland, MI (US)

( * ) Notice: Subject to any disclaimer, the term of this patent is extended or adjusted under 35 U.S.C. 154(b) by 323 days.

(21) Appl. No.: 14/599,306

(22) Filed: Jan. 16, 2015

(65) Prior Publication Data
US 2016/0209852 A1 Jul. 21, 2016

(51) Int. Cl.
*G05D 23/19* (2006.01)
*G05B 15/02* (2006.01)

(52) U.S. Cl.
CPC ......... *G05D 23/1917* (2013.01); *G05B 15/02* (2013.01)

(58) Field of Classification Search
CPC .... G05D 23/00; G05D 23/12; G05D 23/1917; G05D 23/1927; G05B 15/02; G05D 13/00; G05D 13/021; G05D 13/024; F24F 11/001; F24F 11/0012; F24F 11/006
See application file for complete search history.

(56) References Cited

U.S. PATENT DOCUMENTS

| | | | |
|---|---|---|---|
| 5,314,004 A | 5/1994 | Strand et al. | |
| 5,651,264 A * | 7/1997 | Lo | F24F 3/065 165/218 |
| 6,463,748 B1 * | 10/2002 | Benedict | F04D 27/0284 62/228.1 |
| 7,770,806 B2 | 8/2010 | Herzon et al. | |
| 7,967,218 B2 | 6/2011 | Alles | |
| 2005/0235137 A1 | 10/2005 | Barr et al. | |
| 2010/0037640 A1 * | 2/2010 | Atwater | B60H 1/3216 62/158 |
| 2013/0345880 A1 | 12/2013 | Asmus | |
| 2014/0131009 A1 | 5/2014 | Zhou et al. | |
| 2015/0059367 A1 * | 3/2015 | Emo | F25B 45/00 62/77 |

OTHER PUBLICATIONS

U.S. Appl. No. 14/572,375, filed Dec. 16, 2014, Johnson Controls Technology Company.

* cited by examiner

*Primary Examiner* — Dennis M Butler
(74) *Attorney, Agent, or Firm* — Foley & Lardner LLP

(57) ABSTRACT

An adaptive capacity constraint management system receives a measured value affected by HVAC equipment at actual operating conditions and uses the measured value to determine an operating value for a variable that affects a capacity of the HVAC equipment at the actual operating condition. The system uses the operating value to calculate a gain factor for the variable relative to design conditions and uses the calculated gain factor to determine a capacity gain for the HVAC equipment relative to the design conditions. The system applies the capacity gain to a design capacity limit for the HVAC equipment to determine a new capacity limit for the HVAC equipment at the actual operating conditions. The system may use the new capacity limit as a constraint in an optimization routine that that selects one or more devices of the HVAC equipment to satisfy a load setpoint.

20 Claims, 13 Drawing Sheets

SYSTEMS AND METHODS FOR ADAPTIVE CAPACITY CONSTRAINT MANAGEMENT

BACKGROUND

The present disclosure relates generally to heating, ventilating, and air conditioning (HVAC) systems that use HVAC devices to serve thermal energy loads (e.g., heating loads, cooling loads, refrigeration loads, etc.). The present disclosure relates more particularly to capacity limits for HVAC devices.

Capacity limits for HVAC devices define a maximum output that be provided by the devices. For example, the capacity limit of a chiller may define the maximum cooling load that the chiller can provide. Capacity limits are typically used in a HVAC system to determine how many devices are needed to satisfy a given thermal energy load. For example, if a chiller has a capacity limit of 3000 tons, a controller for the HVAC system may determine that multiple chillers are required to satisfy a cooling load in excess of 3000 tons. If only one chiller is currently active, the controller may activate an additional chiller to help satisfy the cooling load.

Capacity limits are typically determined by device manufacturers based on manufacturer testing of the devices under design conditions. Capacity limits based on design conditions are referred to herein as design capacity limits. The design capacity limit for a HVAC device may be inaccurate when the device is operated under conditions that differ from the design conditions. The actual capacity limit for a HVAC device may depend on the actual conditions at which the device is operated (i.e., actual operating conditions) and may be unknown in many implementations. Differences between design capacity limits and actual capacity limits for a set of HVAC devices may result in a suboptimal utilization of the HVAC devices to serve a thermal energy load. It is difficult and challenging to identify and effectively use the actual capacity limits for HVAC devices under many operating conditions.

SUMMARY

One implementation of the present disclosure is an adaptive capacity constraint management system. The system includes a communications interface configured to receive a measured value for a thermodynamic property affected by a refrigeration circuit at actual operating conditions and a processing circuit coupled to the communications interface. The processing circuit includes an actual state module that uses the measured value to determine an operating value for a thermodynamic property of a refrigerant used in the refrigeration circuit at the actual operating conditions. The processing circuit further includes a gain module that uses the operating value for the thermodynamic property of the refrigerant to calculate a gain factor for the thermodynamic property of the refrigerant relative to design conditions. The processing circuit further includes a capacity gain module that uses the calculated gain factor to determine a capacity gain for the refrigeration circuit relative to the design conditions. The processing circuit further includes a capacity limit updating module that applies the capacity gain to a design capacity limit for the equipment to determine a new capacity limit for the equipment at the actual operating conditions. The processing circuit further includes an equipment selection module that uses the new capacity limit as a constraint in an optimization routine that selects one or more devices used to satisfy a thermal energy load.

In some embodiments, the thermodynamic property affected by the refrigeration circuit includes at least one of a measured temperature of a chilled fluid that rejects heat to the refrigerant in an evaporator of the refrigeration circuit and a measured temperature of a heated fluid that absorbs heat from the refrigerant in a condenser of the refrigeration circuit.

In some embodiments, using the measured value to determine an operating value for the thermodynamic property of the refrigerant includes at least one of estimating an inlet enthalpy or entropy of the refrigerant at an inlet of an evaporator of the refrigeration circuit and estimating an outlet enthalpy or entropy of the refrigerant at an outlet of the evaporator.

In some embodiments, estimating the inlet enthalpy includes using the measured temperature of the heated fluid to estimate a temperature of the refrigerant at an inlet of an expansion valve of the refrigeration circuit, using the estimated temperature of the refrigerant to estimate an enthalpy of the refrigerant at the inlet of the expansion valve, and using the estimated enthalpy of the refrigerant at the inlet of the expansion valve as the inlet enthalpy. The enthalpy of the refrigerant at the inlet of the expansion valve can be used as the enthalpy at the inlet of the evaporator since the expansion of the refrigerant across the expansion valve is isenthalpic. In some embodiments, the enthalpy of the refrigerant at the inlet of the evaporator can then be used in conjunction with the temperature of the refrigerant at the inlet of the evaporator to calculate other thermodynamic properties of the refrigerant at the inlet of the evaporator.

In some embodiments, estimating the outlet enthalpy or entropy includes using the measured temperature of the chilled fluid to estimate a temperature of the refrigerant at the outlet of the evaporator and using the estimated temperature of the refrigerant to estimate outlet enthalpy or entropy.

In some embodiments, the thermodynamic property of the refrigerant is a volumetric flow rate of the refrigerant. Calculating a gain factor for the volumetric flow rate of the refrigerant relative to design conditions may include determining an isentropic head across a compressor of the refrigeration circuit at the actual operating conditions, using a compressor map to determine a volumetric flow rate of the refrigerant that corresponds to the isentropic head across the compressor at the actual operating conditions, and calculating a ratio between the determined volumetric flow rate of the refrigerant at the actual operating conditions and a volumetric flow rate of the refrigerant at the design conditions.

In some embodiments, the thermodynamic property of the refrigerant is a density of the refrigerant. Calculating a gain factor for the density of the refrigerant relative to design conditions may include determining at least one of a temperature and a pressure of the refrigerant in the evaporator at the actual operating conditions, using at least one of the temperature and the pressure of the refrigerant in the evaporator to determine a density of the refrigerant in the evaporator outlet at the actual operating conditions, and calculating a ratio between the determined density of the refrigerant at the actual operating conditions and a density of the refrigerant at the design conditions.

In some embodiments, the thermodynamic property of the refrigerant is an enthalpy rise of the refrigerant across an evaporator of the refrigeration circuit. Calculating a gain factor for the enthalpy rise of the refrigerant relative to design conditions may include determining a first difference between an enthalpy of the refrigerant at an outlet of the evaporator and an enthalpy of the refrigerant at an inlet of the evaporator at the actual operating conditions, determining a second difference between an enthalpy of the refrigerant at an outlet of the evaporator and an enthalpy of the refrigerant at an inlet of the evaporator at the design conditions, and calculating a ratio between the first difference and the second difference.

In some embodiments, determining a capacity gain for the refrigeration circuit relative to the design conditions comprises combining a plurality of gain factors for individual properties of the refrigerant to calculate a total capacity gain.

In some embodiments, the optimization routine optimizes an amount of power consumed by the one or more devices in satisfying the thermal energy load subject to the new capacity limit. The amount of power consumed by the one or more devices in satisfying the thermal energy subject to the new capacity limit may be less than an optimal amount of power consumed by the one or more devices in satisfying the same thermal energy load subject to the design capacity limit.

Another implementation of the present disclosure is a method for determining a capacity limit of equipment in a refrigeration circuit. The method includes receiving, at a processing circuit, a measured value for a thermodynamic property affected by the refrigeration circuit at actual operating conditions. The method further includes using the measured value to determine, by an actual state module of the processing circuit, an operating value for a thermodynamic property of a refrigerant used in the refrigeration circuit at the actual operating conditions. The method further includes using the operating value for the thermodynamic property of the refrigerant to calculate, by a gain module of the processing circuit, a gain factor for the thermodynamic property of the refrigerant relative to design conditions. The method further includes using the calculated gain factor to determine, by a capacity gain module of the processing circuit, a capacity gain for the refrigeration circuit relative to the design conditions. The method further includes applying the capacity gain to a design capacity limit for the equipment to determine, by a capacity limit updating module of the processing circuit, a new capacity limit for the equipment at the actual operating conditions. The method further includes using the new capacity limit as a constraint in an optimization routine that selects one or more devices used to satisfy a thermal energy load.

Another implementation of the present disclosure is an adaptive capacity constraint management system. The system includes a communications interface configured to receive a measured value affected by HVAC equipment at actual operating conditions and a processing circuit coupled to the communications interface. The processing circuit includes an actual state module that uses the measured value to determine an operating value for a variable that affects a capacity of the HVAC equipment at the actual operating conditions. The processing circuit further includes a gain module that uses the operating value to calculate a gain factor for the variable relative to design conditions. The processing circuit further includes a capacity gain module that uses the calculated gain factor to determine a capacity gain for the HVAC equipment relative to the design conditions. The processing circuit further includes a capacity limit updating module that applies the capacity gain to a design capacity limit for the HVAC equipment to determine a new capacity limit for the HVAC equipment at the actual operating conditions. The processing circuit further includes an equipment selection module that uses the new capacity limit as a constraint in an optimization routine that selects one or more devices of the HVAC equipment used to achieve a load setpoint.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Figure 1:
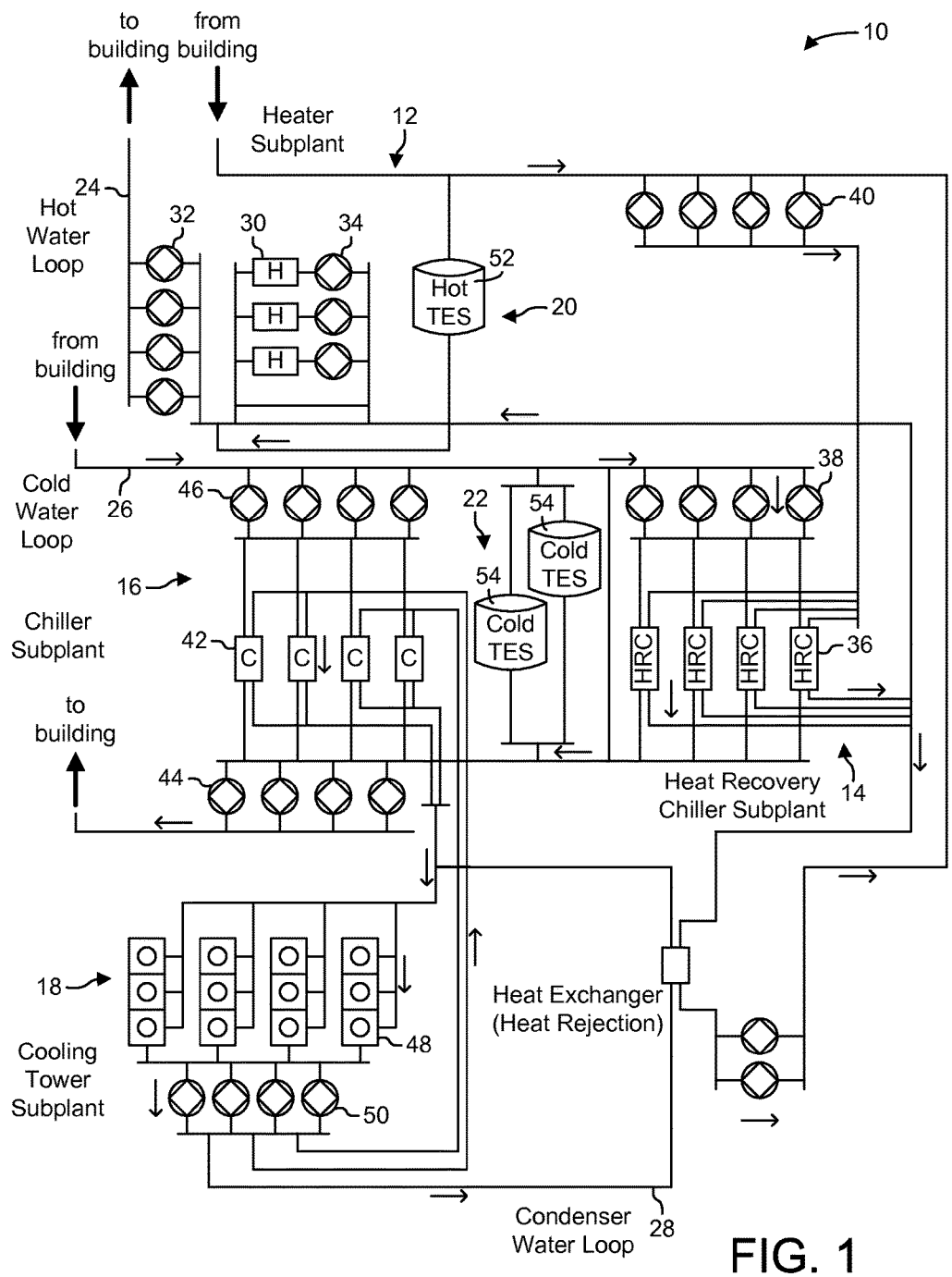
FIG. 1 is a diagram of a central plant including a plurality of HVAC devices used to serve the thermal energy loads of a building or building system, according to an exemplary embodiment.

Referring generally to the FIGURES, systems and methods for adaptive capacity constraint management are shown, according to several exemplary embodiments. The systems and methods described herein may be used to adaptively determine and update capacity limits for various types of HVAC devices (e.g., chillers, heaters, pumps, fans, etc.). In some embodiments, the HVAC devices are used to satisfy the thermal energy loads of a building or building system. For example, the HVAC devices may be components of a central plant configured to serve the heating and/or cooling loads of a building. The HVAC devices may be operated by a controller that runs an optimization routine to optimize (e.g., minimize) an amount of power consumed by the HVAC devices to satisfy the building loads.

The optimization routine may be constrained by the capacity limits of the HVAC devices. The capacity limit of a device may be defined by the maximum load that can be satisfied by the device. In some embodiments, the optimization routine identifies an optimal set of the HVAC devices for use in serving the building loads subject to a constraint that the total capacity of the set is sufficient to satisfy the building loads. When the load assigned to the set exceeds the combined capacity limit, the controller may activate another device to help satisfy the assigned load. For example, if a chiller has a capacity limit of 3000 tons, the controller may determine that multiple chillers are required to satisfy a cooling load in excess of 3000 tons. If only one chiller is currently active, the controller may activate an additional chiller to help satisfy the cooling load.

Device capacity limits are generally provided by device manufacturers based on manufacturer testing of the devices under design conditions. Such capacity limits based on design conditions are referred to herein as design capacity limits. The design capacity limit for a HVAC device may be inaccurate when the device is operated under conditions that differ from the design conditions. The actual capacity limit for a HVAC device may depend on the actual operating conditions and may be unknown in many implementations. Differences between design capacity limits and actual capacity limits may cause the optimization routine to identify a suboptimal combination of HVAC devices for a given operating condition. For example, if the design capacity limit for a set of HVAC devices is less than the actual capacity limit, the controller may unnecessarily activate an additional power-consuming device to satisfy a given load.

Advantageously, the systems and methods described herein may be used to adaptively determine actual capacity limits for various HVAC devices as a function of the actual operating conditions. In some embodiments, an adaptive capacity constraint management system identifies one or more variables that affect the capacity of a HVAC device. The system may estimate actual operating values for the identified variables based on measurements that reflect the actual operating conditions. In some embodiments, the system calculates a gain factor for each of the identified variables relative to a design value for the variable and combines the gain factors to determine a total capacity gain for the HVAC device relative to design conditions. The total capacity gain can be applied to a design capacity limit for the HVAC device to determine an actual capacity limit for the HVAC device. The actual capacity limits can be adjusted to adapt to current operating conditions. In some embodiments, the adaptive capacity limits are provided to the optimization routine and used by the optimization routine in place of the design capacity limits. The adaptive capacity limits advantageously allow the optimization routine to determine an optimal set of HVAC devices for use in serving a given load based on current operating conditions.

The following paragraphs describe exemplary systems and methods that may be used to adjust the capacity limits for one or more chillers in a central plant that use a vapor-compression refrigeration circuit to provide cooling for a chilled water system. Although the capacity limit adjustments are described primarily with respect to chiller capacity limits, it is understood that similar capacity limit adjustments may be applied to other types of devices (e.g., pumps, boilers, rooftop units, etc.) in the central plant or any other type of HVAC equipment, according to the teachings of the present disclosure.

Referring now to FIG. 1, a diagram of a central plant 10 is shown, according to an exemplary embodiment. Central plant 10 is shown to include a plurality of subplants including a heater subplant 12, a heat recovery chiller subplant 14, a chiller subplant 16, a cooling tower subplant 18, a hot thermal energy storage (TES) subplant 20, and a cold thermal energy storage (TES) subplant 22. Subplants 12-22 consume resources (e.g., water, natural gas, electricity, etc.) from utilities to serve the thermal energy loads (e.g., hot water, cold water, heating, cooling, etc.) of a building or campus. For example, heater subplant 12 may be configured to heat water in a hot water loop 24 that circulates the hot water between central plant 10 and a building (not shown). Chiller subplant 16 may be configured to chill water in a cold water loop 26 that circulates the cold water between central plant 10 and the building. Heat recovery chiller subplant 14 may be configured to transfer heat from cold water loop 26 to hot water loop 24 to provide additional heating for the hot water and additional cooling for the cold water. Condenser water loop 28 may absorb heat from the cold water in chiller subplant 16 and reject the absorbed heat in cooling tower subplant 18 or transfer the absorbed heat to hot water loop 24. Hot TES subplant 20 and cold TES subplant 22 store hot and cold thermal energy, respectively, for subsequent use.

Hot water loop 24 and cold water loop 26 may deliver the heated and/or chilled water to air handlers located on the rooftop of a building or to individual floors or zones of the building. The air handlers push air past heat exchangers (e.g., heating coils or cooling coils) through which the water flows to provide heating or cooling for the air. The heated or cooled air may be delivered to individual zones of the building to serve the thermal energy loads of the building. The water then returns to central plant 10 to receive further heating or cooling in subplants 12-22.

Although central plant 10 is shown and described as heating and cooling water for circulation to a building, it is understood that any other type of working fluid (e.g., glycol, $CO_2$, etc.) may be used in place of or in addition to water to serve the thermal energy loads. In other embodiments, central plant 10 may provide heating and/or cooling directly to the building or campus without requiring an intermediate heat transfer fluid. Central plant 10 may be physically separate from a building served by subplants 12-22 or physically integrated with the building (e.g., located within the building).

Each of subplants 12-22 may include a variety of equipment configured to facilitate the functions of the subplant. For example, heater subplant 12 is shown to include a plurality of heating elements 30 (e.g., boilers, electric heaters, etc.) configured to add heat to the hot water in hot water loop 24. Heater subplant 12 is also shown to include several pumps 32 and 34 configured to circulate the hot water in hot water loop 24 and to control the flow rate of the hot water through individual heating elements 30. Heat recovery chiller subplant 14 is shown to include a plurality of heat recovery heat exchangers 36 (e.g., refrigeration circuits) configured to transfer heat from cold water loop 26 to hot water loop 24. Heat recovery chiller subplant 14 is also shown to include several pumps 38 and 40 configured to circulate the hot water and/or cold water through heat recovery heat exchangers 36 and to control the flow rate of the water through individual heat recovery heat exchangers 36.

Chiller subplant 16 is shown to include a plurality of chillers 42 configured to remove heat from the cold water in cold water loop 26. Chiller subplant 16 is also shown to include several pumps 44 and 46 configured to circulate the cold water in cold water loop 26 and to control the flow rate of the cold water through individual chillers 42. Cooling tower subplant 18 is shown to include a plurality of cooling towers 48 configured to remove heat from the condenser water in condenser water loop 28. Cooling tower subplant 18 is also shown to include several pumps 50 configured to circulate the condenser water in condenser water loop 28 and to control the flow rate of the condenser water through individual cooling towers 48.

Hot TES subplant 20 is shown to include a hot TES tank 52 configured to store the hot water for later use. Hot TES subplant 20 may also include one or more pumps or valves configured to control the flow rate of the hot water into or out of hot TES tank 52. Cold TES subplant 22 is shown to include cold TES tanks 54 configured to store the cold water for later use. Cold TES subplant 22 may also include one or more pumps or valves configured to control the flow rate of the cold water into or out of cold TES tanks 54. In some embodiments, one or more of the pumps in central plant 10 (e.g., pumps 32, 34, 38, 40, 44, 46, and/or 50) or pipelines in central plant 10 includes an isolation valve associated therewith. Isolation valves may be integrated with the pumps or positioned upstream or downstream of the pumps to control the fluid flows in central plant 10. In various embodiments, central plant 10 may include more, fewer, or different types of devices and/or subplants based on the particular configuration of central plant 10 and the types of loads served by central plant 10.

Figure 2:
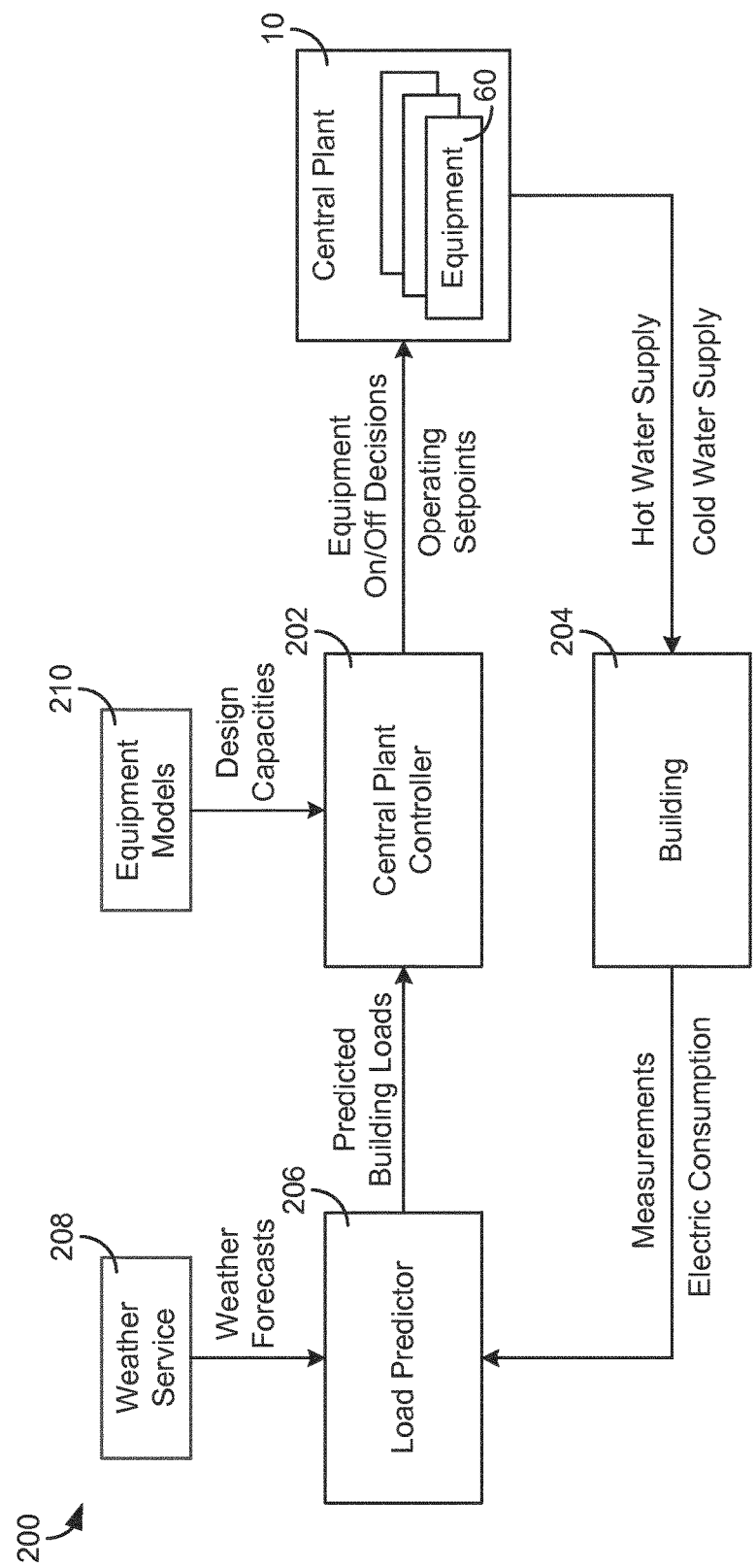
FIG. 2 is a block diagram of a control system for the central plant of FIG. 1, according to an exemplary embodiment.

Referring now to FIG. 2, a block diagram of a control system 200 for central plant 10 is shown, according to an exemplary embodiment. Control system 200 is shown to include a central plant controller 202. Central plant controller 202 may be configured to select a suitable combination of devices in central plant 10 for use in serving the thermal energy loads of a building 204. In FIG. 2, the devices of central plant 10 are represented by equipment 60. Equipment 60 may include, for example, heating devices 30, chillers 42, heat recovery heat exchangers 36, cooling towers 48, thermal energy storage devices 52, 54, pumps 32, 34, 38, 44, 46, and 50, and/or other devices of subplants 12-22, as described with reference to FIG. 1. Individual devices of equipment 60 can be turned on or off to adjust the thermal energy load served by each of subplants 12-22. In some embodiments, individual devices of equipment 60 can be operated at variable capacities (e.g., operating a chiller at 10% capacity or 60% capacity) according to an operating setpoint received from central plant controller 202.

Central plant controller 202 may be configured to generate equipment on/off decisions and/or operating setpoints for equipment 60 and may provide such information as a control output for central plant 10. Central plant 10 may operate equipment 60 according to the control output received from central plant controller 202 to control the hot water supply and/or cold water supply delivered to building 204. For example, central plant controller 202 may determine an on/off configuration and global operating setpoints for equipment 60. In response to the on/off configuration and received global operating setpoints, the subplant controllers may turn individual devices of equipment 60 on or off, and implement specific operating setpoints (e.g., damper position, vane position, fan speed, pump speed, etc.) to reach or maintain the global operating setpoints. In some embodiments, central plant 10 includes one or more subplant level controllers for subplants 12-22. Each subplant level controller may be configured to control the equipment 60 of the corresponding subplant.

Still referring to FIG. 2, control system 200 is shown to include a load predictor 206, a weather service 208, and equipment models 210. Load predictor 206 may be configured to predict the thermal energy loads of building 204. The loads predicted by load predictor 206 may be based, for example, on measurements from building 204, an electric consumption of building 204, and/or weather forecasts from weather service 208. Load predictor 206 may provide the predicted building loads to central plant controller 202. Central plant controller 202 may determine an equipment on/off configuration and/or operating setpoints for equipment 60 in order to satisfy the predicted building loads.

The equipment on/off decisions and operating setpoints generated by central plant controller 202 may be constrained by the design capacities of equipment 60. When the load assigned to a single device of equipment 60 exceeds the design capacity of the device, central plant controller 202 may activate another device of equipment 60 to help satisfy the assigned load. For example, if a chiller has a maximum capacity of 3000 tons, central plant controller 202 may determine that multiple chillers are required to satisfy a predicted cooling load in excess of 3000 tons. If only one chiller is currently active, central plant controller 202 may activate an additional chiller to satisfy the cooling load. Central plant controller 202 may receive design capacities for equipment 60 from equipment models 210 and use the design capacities to select a combination of equipment 60 for use in satisfying the predicted building loads. In some embodiments, central plant controller 202 selects a combination of equipment 60 that results in a lowest total energy consumption to satisfy the predicted building loads.

Central plant controller 202 may be configured to adjust the maximum capacities of equipment 60 to adapt to current operating conditions. Such capacity adjustments are referred to herein as adaptive capacity constraint management. In some instances, the capacity adjustments performed by central plant controller 202 may result in an increased capacity limit for a particular device or group of devices, relative to design conditions. The increased capacity limit may allow central plant controller 202 to use fewer devices of equipment 60 to satisfy a given building load. Advantageously, using fewer devices may result in central plant 10 consuming less energy to satisfy a given building load, under some operating conditions.

Figure 3A:
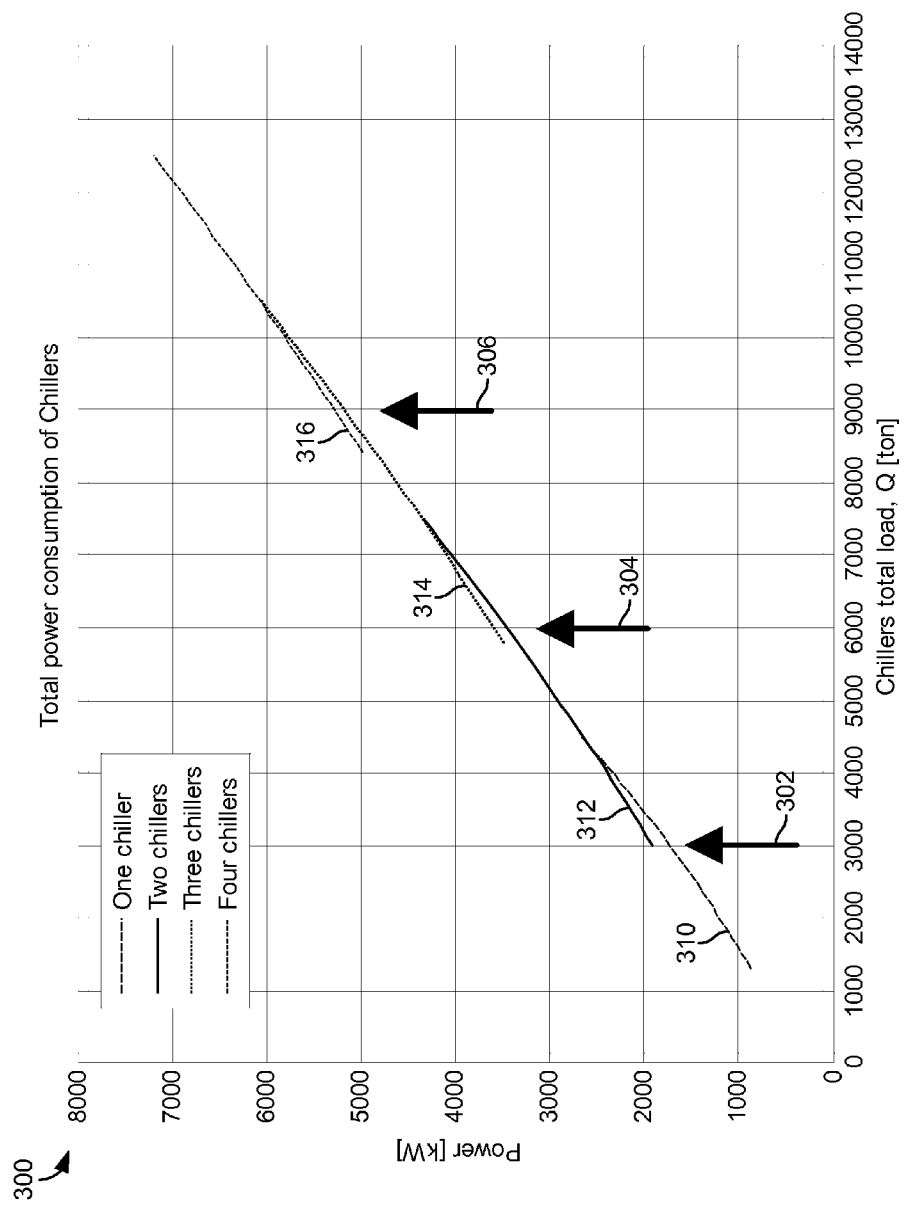
FIGS. 3A-3B are graphs illustrating a power savings that can be realized by adaptively adjusting the capacity limits of a set of chillers in the central plant of FIG. 1, according to an exemplary embodiment.
Figure 3B:
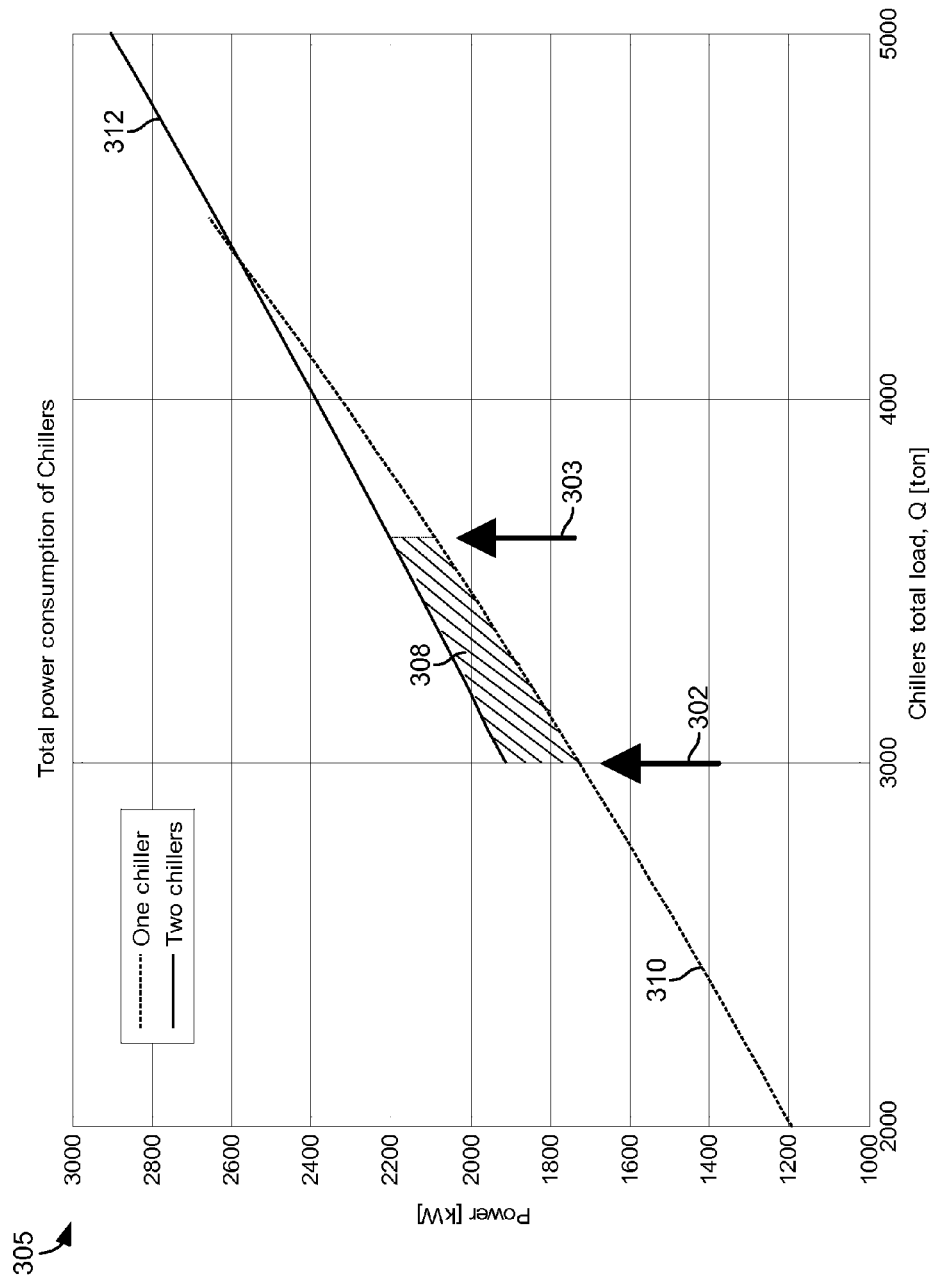

Referring now to FIGS. 3A-3B, a pair of graphs 300 and 305 illustrating a power savings that can be realized by adaptively adjusting the capacity limits of equipment 60 are shown, according to an exemplary embodiment. Graphs 300 and 305 illustrate the power consumption of a group of chillers (e.g., chiller subplant 16) as a function of cooling load. Each chiller has a design capacity of approximately 3000 tons, which defines the maximum capacity for the chiller under design conditions.

Referring particularly to FIG. 3A, line 310 indicates the power consumption of a single chiller operated to serve the cooling load. Lines 312, 314, and 316 indicate the respective power consumptions of two, three, and four chillers operated concurrently to serve the cooling load. Arrows 302, 304, and 306 indicate the cooling loads at which staging up (i.e., activating another chiller) occurs. For example, central plant controller 202 may transition from one active chiller to two active chillers when the cooling load increases past 3000 tons. Similarly, central plant controller 202 may transition from two chillers to three chillers when the cooling load increases past 6000 tons and may transition from three chillers to four chillers when the cooling load increases past 9000 tons. At all three transition points, it is evident from FIG. 3A that the chiller group would have consumed less power if the staging up had occurred at slightly higher load values.

Referring particularly to FIG. 3B, hashed area 308 indicates a potential power savings (e.g., approximately 100-200 kW) that could be realized if the maximum capacity of the first chiller is increased from 3000 tons to approximately 3600 tons. By increasing the maximum capacity to approximately 3600 tons, the transition from one chiller to two chillers may occur when the total chiller load exceeds 3600 tons (arrow 303) instead of 3000 tons (arrow 302). Central plant controller 202 may adaptively adjust the capacity limits for various devices of equipment 60 based on the current operating conditions of the devices.

The following paragraphs describe exemplary systems and methods that may be used to adjust the capacity limits for one or more chillers that use a vapor-compression refrigeration circuit to provide cooling in a chilled water system. Although the capacity limit adjustments are described with respect to chiller capacity limits, it is understood that similar capacity limit adjustments may be applied to other types of devices (e.g., pumps, boilers, rooftop units, etc.) in central plant 10 or any other type of HVAC equipment, according to the teachings of the present disclosure.

Figure 4:
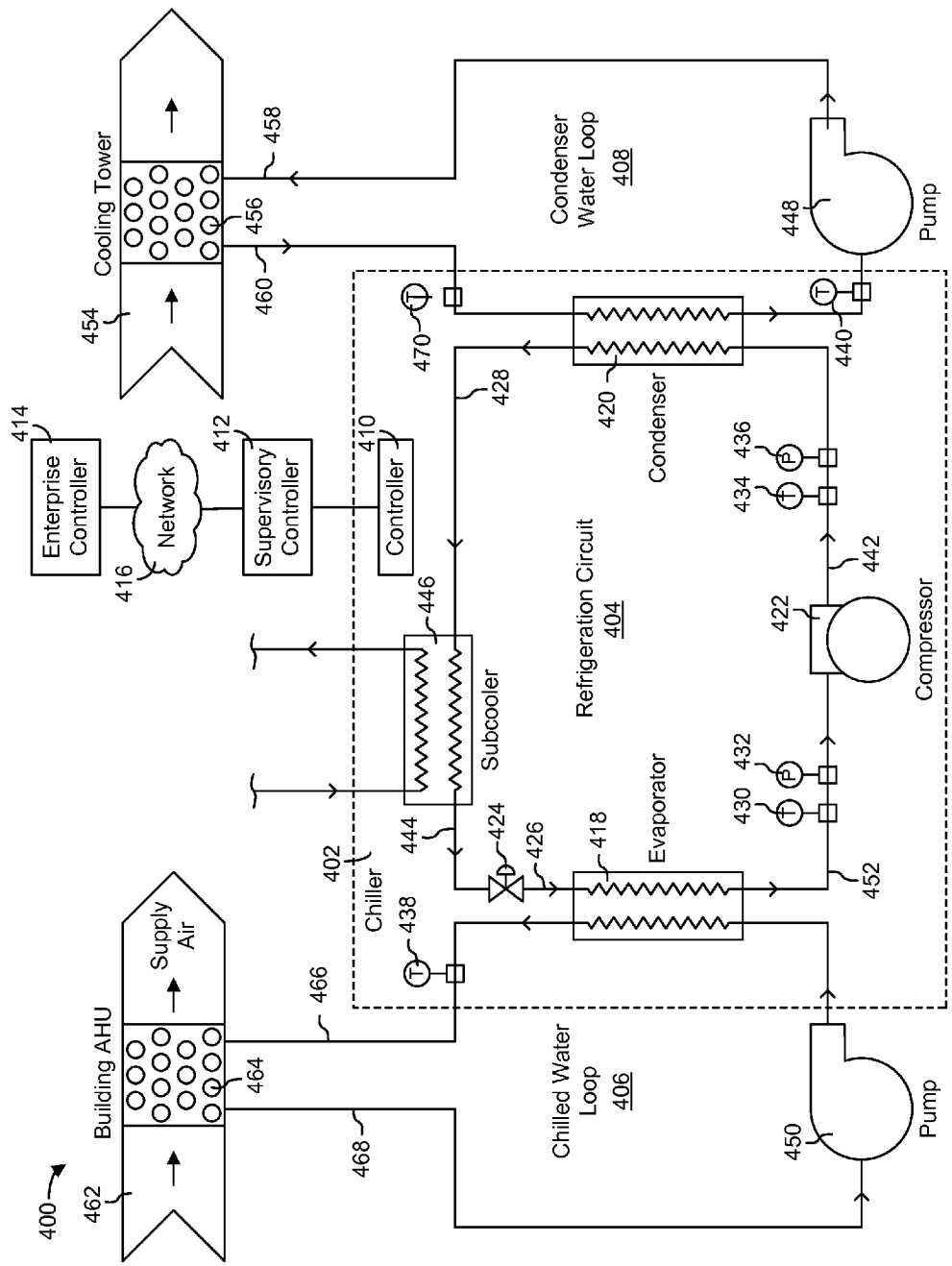
FIG. 4 is a block diagram of a chilled water system that may be used in the central plant of FIG. 1, the chilled water system including a chiller that uses a refrigeration circuit to serve the cooling loads of a chilled water loop, according to an exemplary embodiment.

Referring now to FIG. 4, a block diagram of a chilled water system 400 is shown, according to an exemplary embodiment. Chilled water system 400 is shown to include a chiller 402 and a controller 410. In some embodiments, chiller 402 is one of chillers 42 in central plant 10. In other embodiments, chiller 402 may be any system or device that provides cooling by circulating a refrigerant through a refrigeration circuit 404. Chiller 402 uses a refrigeration circuit 404 to provide cooling for a chilled water loop 406. Controller 410 may be configured to adjust the capacity limit of chiller 402 based on the current operating conditions of refrigeration circuit 404.

Refrigeration circuit 404 is shown to include an evaporator 418, a compressor 422, a condenser 420, a subcooler 446, and an expansion valve 424. Refrigeration circuit 404 may absorb heat from chilled water loop 406 in evaporator 418 and reject heat to condenser water loop 408 in condenser 420. Chilled water loop 406 and condenser water loop 408 may be the same or similar to cold water loop 26 and condenser water loop 28, respectively, as described with reference to FIG. 1. Compressor 422 may be configured to circulate a refrigerant through refrigeration circuit 404. In some embodiments, compressor 422 is operated by controller 410. Compressor 422 may compress the refrigerant to a high pressure, high temperature state and discharge the compressed refrigerant into a compressor discharge line 442 connecting the outlet of compressor 422 to the inlet of condenser 420.

Condenser 420 may receive the compressed refrigerant from discharge line 442. Condenser 420 may also receive a separate heat exchange fluid (e.g., water, a water-glycol mixture, another refrigerant, etc.) from condenser water loop 408. Condenser 420 may be configured to transfer heat from the compressed refrigerant to the heat exchange fluid, thereby causing the compressed refrigerant to condense from a gaseous refrigerant to a liquid or mixed fluid state.

In some embodiments, condenser water loop 408 is a heat recovery circuit configured to use the heat absorbed from the refrigerant for heating applications. In other embodiments, condenser water loop 408 includes a pump 448 for circulating the heat exchange fluid between condenser 420 and cooling tower 454 (e.g., one of cooling towers 48), as shown in FIG. 4. Cooling tower 454 may receive the heat exchange fluid from condenser water loop 408 via piping 458 and may include cooling coils 456 configured to facilitate heat transfer between the heat exchange fluid (e.g., condenser water) and another fluid (e.g., air) flowing through cooling tower 454. The condenser water may reject heat in cooling tower 454 and return to condenser 420 via piping 460.

Condenser 420 may have a condenser approach CA defined as the difference between the refrigerant saturation temperature in condenser 420 $T_{r,cond}$ and the temperature $T_{cw,return}$ of the condenser water returning to cooling tower 454 (e.g., $CA=T_{r,cond}-T_{cw,return}$). The condenser approach CA may be treated as a constant (e.g., $CA \approx 2°$ F.) and may be based on manufacturer specifications or prior operating data for condenser 420. The temperature $T_{cw,return}$ may be measured by a temperature sensor 440 positioned downstream of condenser 420 in condenser water loop 408. In various embodiments, the temperature $T_{r,cond}$ may be calculated using CA and $T_{cw,return}$ (e.g., $T_{r,cond}=CA+T_{cw,return}$) or measured directly by a temperature sensor 434 in refrigeration circuit 404.

Still referring to FIG. 4, refrigeration circuit 404 is shown to include a line 428 connecting an outlet of condenser 420 to an inlet of subcooler 446. Subcooler 446 may receive the condensed refrigerant from line 428 and further cool the condensed refrigerant to a subcooled state. For example, subcooler 446 may pass the condensed refrigerant through a cooling coil or heat exchanger configured to remove additional heat from the condensed refrigerant. Subcooler 446 may discharge the subcooled refrigerant into line 444.

Subcooler 446 may have a subcooler approach SCA defined as the difference between the subcooling temperature $T_{r,sub}$ (i.e., the temperature of the refrigerant in line 444) and the temperature $T_{cw,supply}$ of the condenser water supplied to condenser 420 from cooling tower 454 (e.g., $SCA=T_{r,sub}-T_{cw,supply}$). The subcooler approach SCA may be treated as a constant (e.g., $SCA \approx 2°$ F.) and may be based on manufacturer specifications or prior operating data for subcooler 446. The temperature $T_{cw,supply}$ may be measured by a temperature sensor 470 positioned upstream of condenser 420 in condenser water loop 408. In various embodiments, the temperature $T_{r,sub}$ may be calculated using SCA and $T_{cw,supply}$ (e.g., $T_{r,sub}=SCA+T_{cw,supply}$) or measured directly by a temperature sensor along line 444.

Still referring to FIG. 4, line 444 is shown connecting an outlet of subcooler 446 to an inlet of expansion valve 424. Expansion valve 424 may be configured to expand the refrigerant in refrigeration circuit 404 to a low temperature and low pressure state. Expansion valve 424 may be a fixed position valve or variable position valve. Expansion valve 424 may be actuated manually or automatically (e.g., by controller 410 via a valve actuator) to adjust the expansion of the refrigerant passing therethrough. Expansion valve 424 may output the expanded refrigerant into line 426 connecting an outlet of expansion valve 424 to an inlet of evaporator 418.

Evaporator 418 may receive the expanded refrigerant from line 426. Evaporator 418 may also receive a separate chilled fluid (e.g., water, a water-glycol mixture, another refrigerant, etc.) from chilled water loop 406. Evaporator 418 may be configured to transfer heat from the chilled fluid (e.g., chilled water) to the expanded refrigerant in refrigeration circuit 404, thereby cooling the chilled water and causing the expanded refrigerant to evaporate. In some embodiments, chilled water loop 406 includes a pump 450 for circulating the chilled water between evaporator 418 and an air handling unit (AHU) 462. AHU 462 may receive the chilled water from chilled water loop 406 via piping 466 and may include cooling coils 464 configured to facilitate heat transfer between the chilled water and another fluid (e.g., air) flowing through AHU 462. The chilled water may absorb heat in AHU 462 and return to evaporator 418 via piping 468. Evaporator 418 may output the heated refrigerant to suction line 452 connecting the outlet of evaporator 418 with the inlet of compressor 422.

Evaporator 418 may have an evaporator approach EA defined as the difference between the temperature of the chilled water $T_{chw,supply}$ supplied to AHU 462 and the refrigerant saturation temperature in evaporator 418 $T_{r,evap}$ (e.g., $EA = T_{chw,supply} - T_{r,evap}$). The evaporator approach EA may be treated as a constant (e.g., $EA \approx 2°$ F.) and may be based on manufacturer specifications or prior operating data for evaporator 418. The temperature $T_{chw,supply}$ may be measured by a temperature sensor 438 positioned downstream of evaporator 418 in chilled water loop 406. In various embodiments, the temperature $T_{r,evap}$ may be calculated using EA and $T_{chw,supply}$ (e.g., $T_{r,evap} = T_{chw,supply} - EA$) or measured directly by a temperature sensor 430 in refrigeration circuit 404.

In some embodiments, chiller 402 includes various sensors configured to measure one or more thermodynamic properties (e.g., temperature, pressure, flow rate, etc.) of the refrigerant in refrigeration circuit 404, the chilled water in chilled water loop 406, and/or the condenser water in condenser water loop 408. For example, refrigeration circuit 404 is shown to include a temperature sensor 430 positioned to measure a temperature of the refrigerant in suction line 452, a pressure sensor 432 positioned to measure a pressure of the refrigerant in suction line 452, a temperature sensor 434 positioned to measure the temperature of the refrigerant in discharge line 442, and a pressure sensor 436 positioned to measure the pressure of the refrigerant in discharge line 442. Chilled water loop 406 is shown to include a temperature sensor 438 positioned to measure a temperature of the chilled water in loop 406 downstream of evaporator 418. Condenser water loop 408 is shown to include a temperature sensor 470 positioned to measure a temperature of the condenser water in loop 408 upstream of condenser 420 and a temperature sensor 440 positioned to measure a temperature of the condenser water in loop 408 downstream of condenser 420. Chiller 402 may include any number and/or type of sensors at various locations in refrigeration circuit 404, chilled water loop 406, and/or condenser water loop 408.

Still referring to FIG. 4, chiller 402 is shown to include a controller 410. In some embodiments, controller 410 is an embedded controller for chiller 402 configured to control the components of refrigeration circuit 404. For example, controller 410 may activate/deactivate compressor 422 and open/close expansion valve 424. Controller 410 may be configured to determine the actual capacity of chiller 402. The actual capacity of chiller 402 may be defined by the maximum rate at which refrigeration circuit 404 can remove heat from chilled water loop 406. The actual capacity of chiller 402 may be dependent on the current operating conditions of refrigeration circuit 404 and may be determined using the measured or calculated thermodynamic properties of the refrigerant.

Controller 410 may receive measurement inputs from sensors 430-440 and 470 and use the measurement inputs to determine current operating conditions for refrigeration circuit 404. The current operating conditions may include, for example, operating values for one or more properties or states of the refrigerant (e.g., temperature, pressure, enthalpy, density, entropy, volumetric flow rate, etc.) at various locations in refrigeration circuit 404. Controller 410 may use the operating values to calculate a gain factor for one or more of the refrigerant properties or states relative to design conditions. Controller 410 may combine (e.g., multiply) the gain factors to determine a total capacity gain for chiller 402 relative to design conditions. The total capacity gain may be applied to the design capacity for chiller 402 to determine an adjusted capacity limit for chiller 402. Controller 410 may provide the adjusted capacity limit to a controller for central plant 10. Advantageously, the adjusted capacity limit may be used to adaptively select a suitable (i.e., power efficient) combination of devices for use in serving a building energy load, as described with reference to FIGS. 2-3B.

In various embodiments, controller 410 performs the capacity determination locally or communicates the measured and/or calculated thermodynamic values to an upstream controller (e.g., a supervisory controller 412, an enterprise controller 414, etc.) or computer system for system-level or enterprise-level capacity determinations. Supervisory controller 412 may be a central plant controller (e.g., central plant controller 202) or a controller for a building automation system. Supervisory controller 412 may be connected with controller 410 via a local network (e.g., a LAN, a BACnet network, etc.), whereas enterprise controller 414 may be connected with supervisory controller 412 and controller 410 via a remote network 416 (e.g., a WAN, the Internet, a cellular network, etc.). The adaptive capacity constraint determinations described herein may be performed by any type or level of controller (e.g., a local controller, a supervisory controller, an enterprise controller, etc.), control system (e.g., a central plant control system, a refrigeration control system, a building control system, etc.), or computer system, in various implementations.

Figure 5:
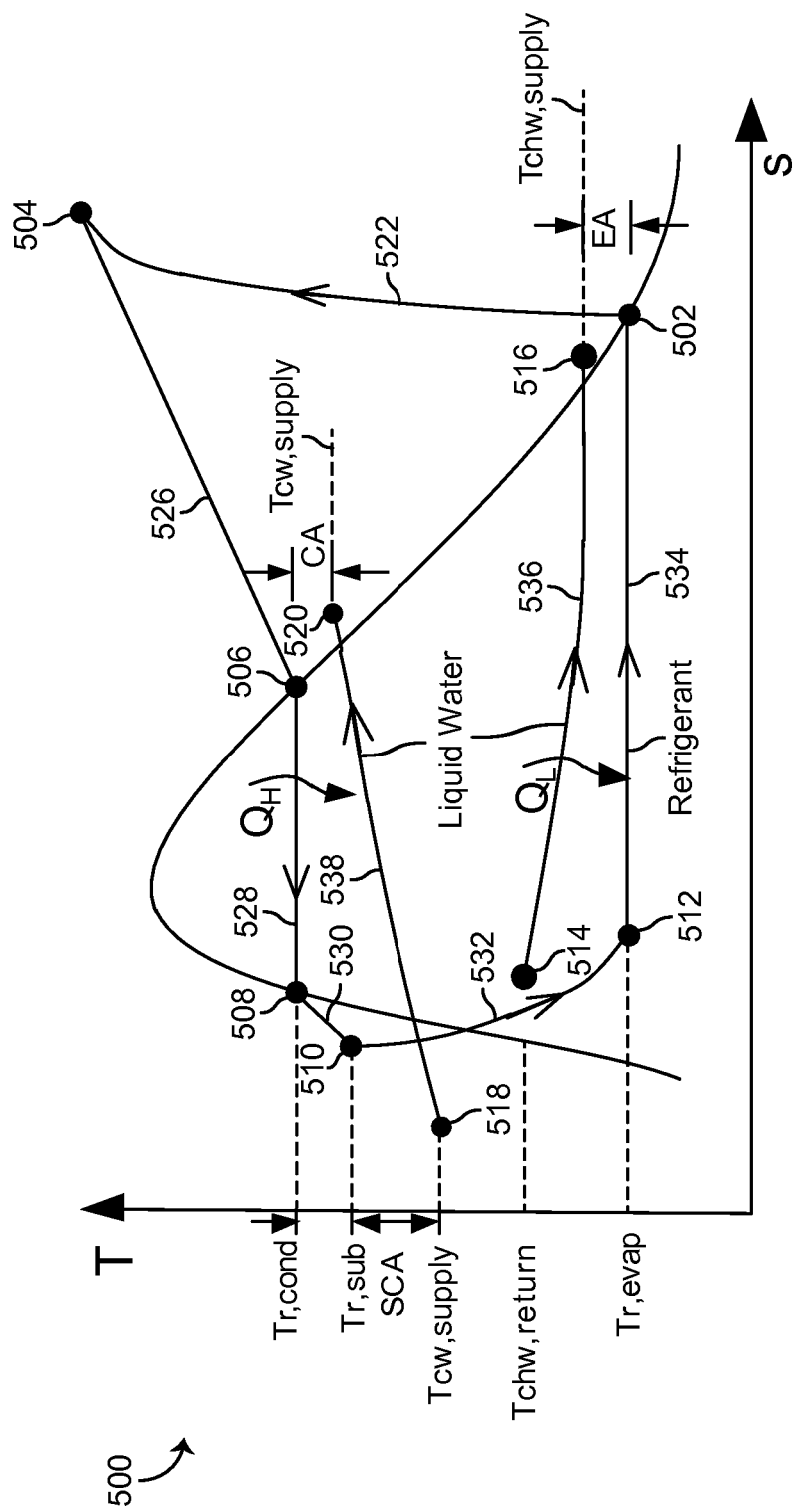
FIG. 5 is a temperature-entropy (T-S) diagram illustrating the operation of chilled water system of FIG. 4 under design conditions, according to an exemplary embodiment.

Referring now to FIG. 5, a temperature-entropy (T-S) diagram 500 illustrating the operation of chilled water system 400 is shown, according to an exemplary embodiment. State 502 represents the state of the refrigerant in refrigeration circuit 404 at the outlet of evaporator 418 (e.g., in line 452). In state 502, the refrigerant may be a saturated vapor having a temperature of $T_{r,evap}$ and a negligible amount of superheat. From state 502, the refrigerant is compressed along compression line 522 by compressor 422 until the refrigerant reaches state 504. State 504 represents the state of the refrigerant at the outlet of compressor 422 (e.g., in line 442). In state 504, the refrigerant may be a high temperature and high pressure compressed vapor.

From state 504, the refrigerant is condensed along condensation line 526 in condenser 420 until the refrigerant reaches a saturated vapor state 506. In condenser 420, the refrigerant rejects heat $Q_H$ to the condenser water in loop 408. The refrigerant decreases in entropy along condensation line 528 until the refrigerant reaches a saturated liquid state 508. State 508 represents the state of the refrigerant at the outlet of condenser 420 (e.g., in line 428). The heat $Q_H$ rejected by the refrigerant in condenser 420 is absorbed by the condenser water and causes the condenser water to transition from state 518 to state 520 along heat absorption line 538. State 518 represents the state of the condenser water at the inlet of condenser 420, at which point the condenser water has a temperature of $T_{cw,supply}$. State 520 represents the state of the condenser water at the outlet of condenser 420, at which point the condenser water has a (higher) temperature of $T_{cw,return}$. Although line 538 is shown partially within the saturation dome in FIG. 5, it should be noted that the condenser water is a single-phase liquid and not a liquid-vapor mixture at all points along line 538.

From state 508, the refrigerant is subcooled along subcooling line 530 in subcooler 446 until the refrigerant reaches a subcooled state 510. State 510 represents the state of the refrigerant at the outlet of subcooler 446 (e.g., in line 444). From state 510, the refrigerant passes through expansion valve 424 and is expanded along expansion line 532 into a low temperature and low pressure state 512. State 512 represents the state of the refrigerant at the inlet of evaporator 418 (e.g., in line 426).

From state 512, the refrigerant is evaporated along evaporation line 534 in evaporator 418. In evaporator 418, the refrigerant absorbs heat $Q_L$ from the water in loop 406. The refrigerant increases in entropy along evaporation line 534 until the refrigerant reaches state 502 at the outlet of evaporator 418. The heat $Q_L$ absorbed by the refrigerant in evaporator 418 is rejected by the chilled water in loop 406 and causes the chilled water to transition from state 514 to state 516 along heat rejection line 536. State 514 represents the state of the chilled water at the inlet of evaporator 418, at which point the chilled water has a temperature of $T_{chw,return}$. State 516 represents the state of the chilled water at the outlet of evaporator 418, at which point the chilled water has a (lower) temperature of $T_{chw,supply}$. Although line 536 is shown partially within the saturation dome in FIG. 5, it should be noted that the chilled water is a single-phase liquid and not a liquid-vapor mixture at all points along line 536.

Still referring to FIG. 5, the evaporator approach EA is shown in diagram 500 as the difference between the temperature $T_{chw,supply}$ of the chilled fluid in state 516 and the temperature $T_{r,evap}$ of the refrigerant in the evaporator in states 502 and 512 (e.g., $EA=T_{chw,supply}-T_{r,evap}$). The temperature $T_{chw,supply}$ of the chilled fluid in state 516 may be measured by a temperature sensor positioned downstream of the evaporator in chilled water loop 406. The evaporator approach EA may be treated as a constant value and subtracted from $T_{chw,supply}$ to calculate $T_{r,evap}$ (e.g., $T_{r,evap}=T_{chw,supply}-EA$).

The subcooler approach SCA is shown as the difference between the temperature $T_{r,sub}$ of the refrigerant in state 510 and the temperature $T_{cw,supply}$ of the condenser loop fluid in state 518 (e.g., $SCA=T_{r,sub}-T_{cw,supply}$). The temperature $T_{cw,supply}$ of the condenser loop fluid in state 518 may be measured by a temperature sensor positioned upstream of the condenser in condenser water loop 408. The subcooler approach SCA may be treated as a constant value and added to $T_{cw,supply}$ to calculate $T_{r,sub}$ (e.g., $T_{r,sub}=SCA+T_{cw,supply}$).

The condenser approach CA is shown as the difference between the temperature $T_{r,cond}$ of the refrigerant in the condenser in states 506 and 508 and the temperature $T_{cw,return}$ of the condenser loop fluid in state 520 (e.g., $CA=T_{r,cond}-T_{cw,return}$). The temperature $T_{cw,return}$ of the condenser loop fluid in state 520 may be measured by a temperature sensor positioned downstream of the condenser in condenser water loop 408. The condenser approach CA may be treated as a constant value and added to $T_{cw,return}$ to calculate $T_{r,cond}$ (e.g., $T_{r,cond}=CA+T_{cw,return}$).

Figure 6A:
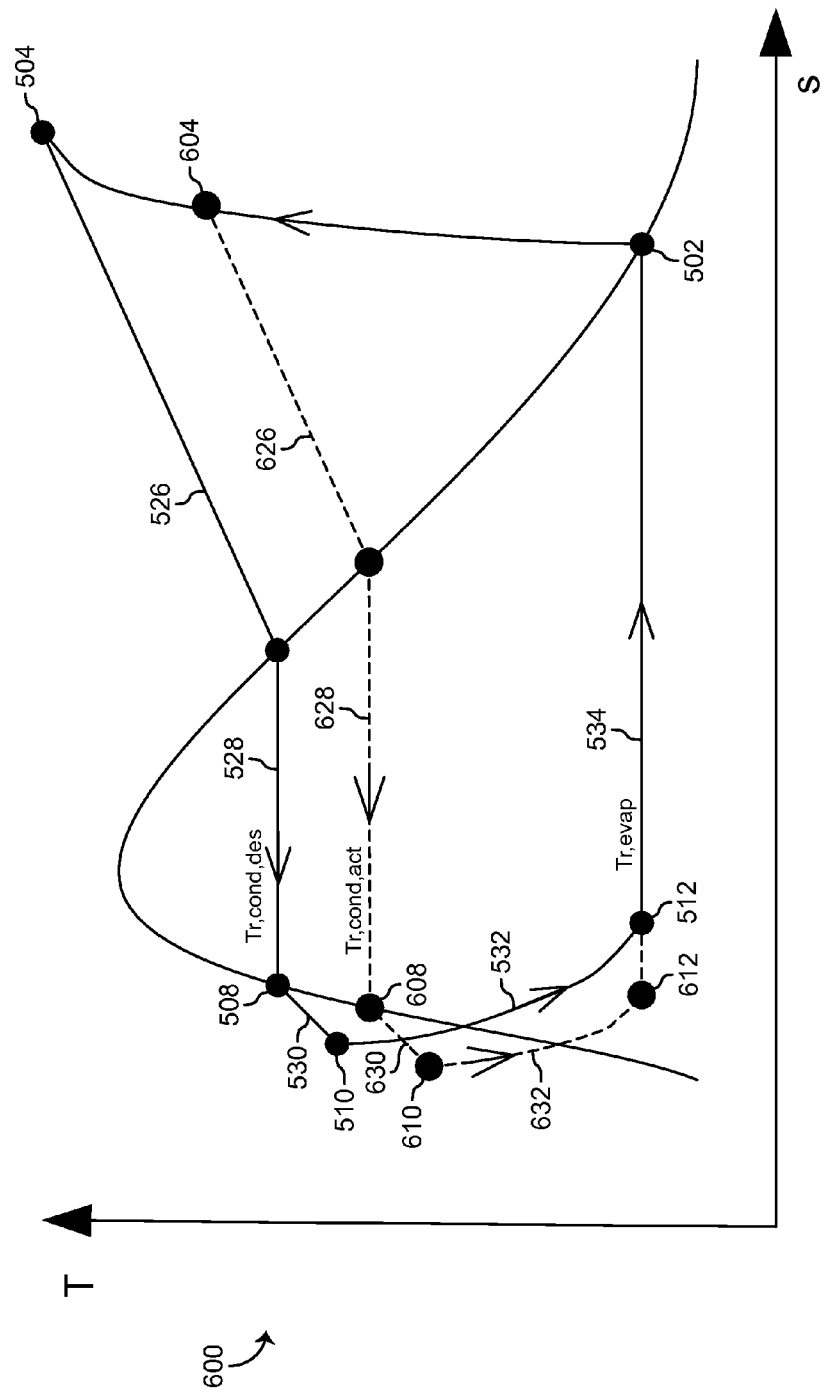
FIGS. 6A-6B are T-S diagrams illustrating the operation of the chilled water system of FIG. 4 under reduced lift conditions, according to an exemplary embodiment.
Figure 6B:
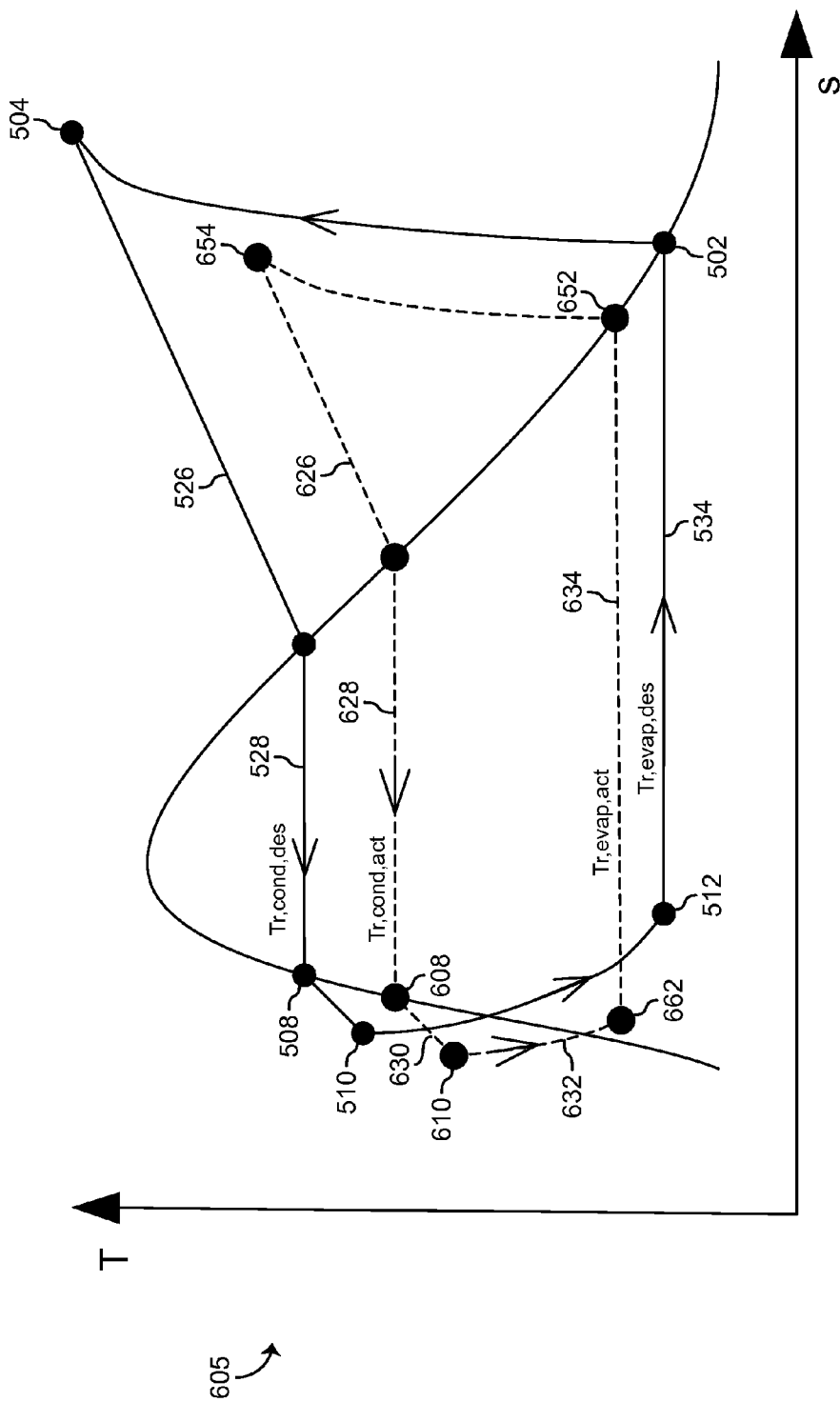

Referring now to FIGS. 6A-6B, a pair of temperature-entropy diagrams 600 and 605 illustrating the operation of chilled water system 400 under reduced lift conditions are shown, according to an exemplary embodiment. The lift of chilled water system 400 may be defined as the difference between the temperature $T_{cw,supply}$ of the condenser loop fluid at the inlet of the condenser in state 518 and the temperature $T_{chw,supply}$ of the chilled fluid at the outlet of the evaporator in state 516 (i.e., $Lift=T_{cw,supply}-T_{chw,supply}$). For embodiments in which the condenser approach CA and the evaporator approach EA are approximated as constant values, a reduced lift condition may occur when the actual temperature $T_{r,cond,act}$ of the refrigerant in the condenser is less than the design value $T_{r,cond,des}$ and/or when the actual temperature $T_{r,evap,act}$ of the refrigerant in the evaporator is greater than the design value $T_{r,evap,des}$.

Referring particularly to FIG. 6A, diagram 600 illustrates a reduced lift condition resulting from a refrigerant condensation temperature $T_{r,cond,act}$ that is less than the design value $T_{r,cond,des}$. In diagram 600, the evaporated refrigerant from state 502 is compressed to an actual compression state 604 having a temperature lower than the temperature of the design compression state 504. From state 604, the refrigerant is condensed along condensation lines 626 and 628 until the refrigerant reaches state 608. The condensation along line 628 occurs at an actual condensation temperature $T_{r,cond,act}$ that is less than the design condensation temperature $T_{r,cond,des}$. From state 608, the refrigerant is subcooled along subcooling line 630 until the refrigerant reaches actual subcooled state 610. The subcooled refrigerant is then expanded along expansion line 632 until the refrigerant reaches actual expanded state 612. In state 612, the refrigerant may have an entropy (and enthalpy) that is less than the entropy (and enthalpy) of the refrigerant in state 512 under design conditions. From state 612, the refrigerant is evaporated along evaporation line 534 until the refrigerant reaches state 502 at the outlet of the evaporator.

Referring particularly to FIG. 6B, diagram 605 illustrates a reduced lift condition resulting from both a refrigerant condensation temperature $T_{r,cond,act}$ that is less than the design value $T_{r,cond,des}$ and a refrigerant evaporation temperature $T_{r,evap,act}$ that is greater than the design value $T_{r,evap,des}$. In diagram 605, state 652 represents the actual state of the refrigerant at the outlet of the evaporator. In state 652, the refrigerant may have an entropy (and enthalpy) that is less than the entropy (and enthalpy) of the refrigerant in state 502 under design conditions. From state 652, the refrigerant is compressed to an actual compression state 654 and condensed along condensation lines 626 and 628 until the refrigerant reaches state 608. The condensation along line 628 occurs at an actual condensation temperature $T_{r,cond,act}$ that is less than the design condensation temperature $T_{r,cond,des}$. From state 608, the refrigerant is subcooled along subcooling line 630 and expanded along expansion line 632 until the refrigerant reaches actual expanded state 662. In state 662, the refrigerant may have an entropy (and enthalpy) that is less than the entropy (and enthalpy) of the refrigerant in state 512 under design conditions. However, the actual evaporation temperature $T_{r,evap,act}$ of the refrigerant in state 662 may be greater than the design evaporation temperature $T_{r,evap,des}$ of the refrigerant in state 512. From state 662, the refrigerant is evaporated along evaporation line 634 until the refrigerant reaches state 652 at the outlet of the evaporator.

For implementations in which refrigeration circuit 404 is operated as a steady state thermodynamic process (e.g., a control volume) with negligible work and potential/kinetic energy changes, the heat transfer rate Q in the evaporator of refrigeration circuit 404 may be represented by the following equation:

$$Q=\dot{m}_r(h_{out}-h_{in})=\dot{m}_rT_{r,evap}(s_{out}-s_{in})=\dot{V}_r\rho_r(h_{out}-h_{in})$$

where $\dot{m}$ is the mass flow rate of the refrigerant through evaporator 418, $\dot{V}_r$ is the volumetric flow rate of the refrigerant through evaporator 418, $\rho_r$ is the density of the refrigerant in evaporator 418, $h_{out}$ and $s_{out}$ are the enthalpy and entropy (respectively) of the refrigerant at the outlet of evaporator 418, and $h_{in}$ and $s_{in}$ are the enthalpy and entropy (respectively) of the refrigerant at the inlet of evaporator 418. Under design conditions, $h_{out}$ and $s_{out}$ correspond to state of the refrigerant in state 502 and $h_{in}$ and $s_{in}$ correspond to the state of the refrigerant in state 512. Under the reduced lift condition shown in FIG. 6A, $h_{out}$ and $s_{out}$ still correspond to state of the refrigerant in state 502; however $h_{in}$ and $s_{in}$ correspond to the state of the refrigerant in state 612. Under the reduced lift condition shown in FIG. 6B, $h_{out}$ and $s_{out}$ correspond to state of the refrigerant in state 652 and $h_{in}$ and $s_{in}$ correspond to the state of the refrigerant in state 662.

The capacity of refrigeration circuit 404 may be proportional to the heat transfer rate Q in evaporator 418. The preceding equation shows that the heat transfer rate Q is a function of the enthalpy increase across the evaporator (i.e., $h_{out}-h_{in}$), the volumetric flow rate $\dot{V}_r$, and the density $\rho_r$. Controller 410 may be configured to calculate the actual enthalpy increase, volumetric flow rate $\dot{V}_r$, and density $\rho_r$ under current operating conditions as described in greater detail below. Controller 410 may compare the calculated values with design conditions to determine a gain factor for each of the variables that affect the heat transfer rate Q. Controller 410 may apply the gain factors to the design capacity of refrigeration circuit 404 to determine an adjusted capacity limit based on the current operating conditions.

Figure 7:
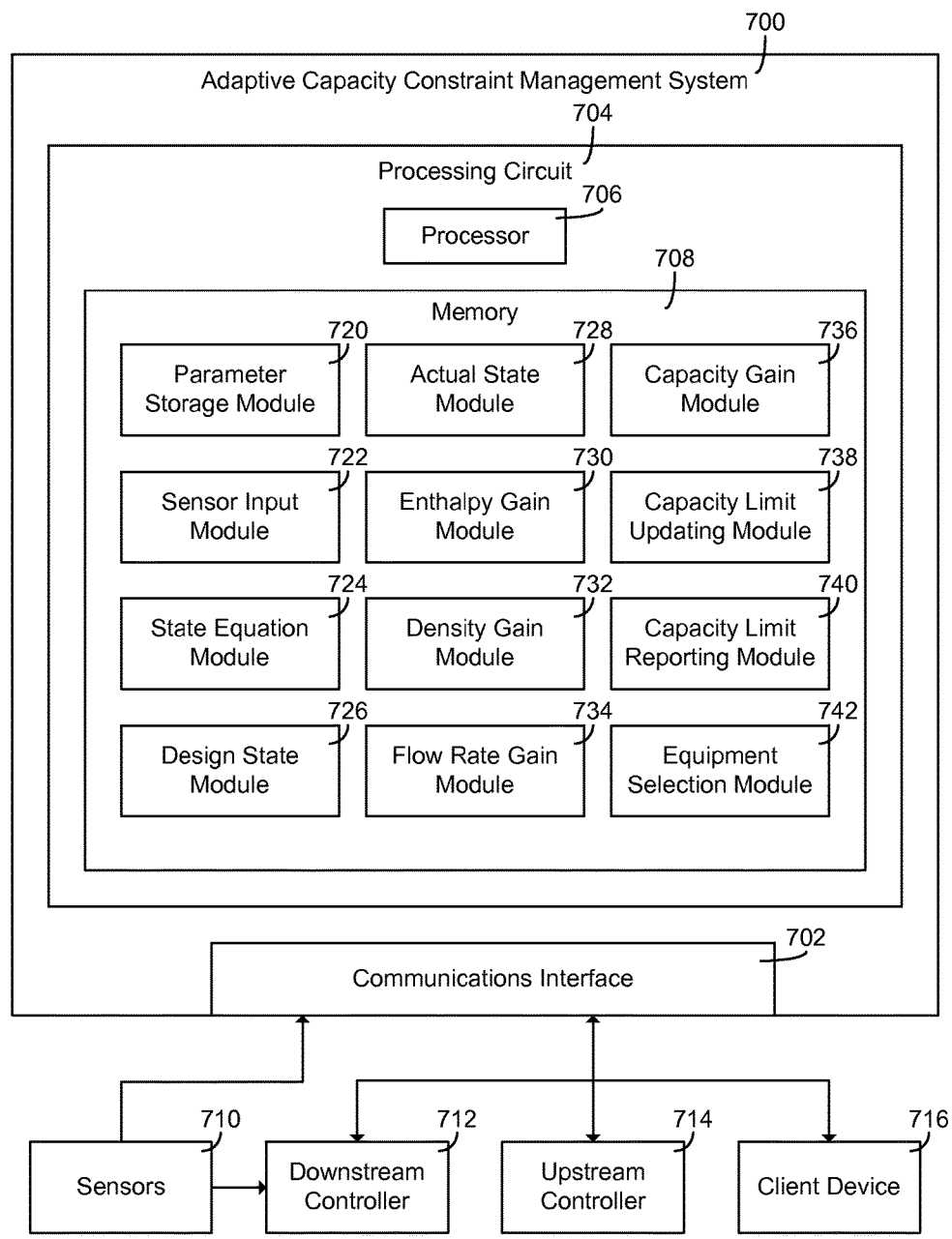
FIG. 7 is a block diagram of an adaptive capacity constraint management system that may be used to adaptively adjust the capacity limits of various HVAC devices, according to an exemplary embodiment.

Referring now to FIG. 7, a block diagram of an adaptive capacity constraint management system 700 is shown, according to an exemplary embodiment. In various embodiments, system 700 may be a component of chiller controller 410, supervisory controller 412, enterprise controller 414, or another computer system configured to adaptively adjust capacity limits for HVAC devices using measured or calculated thermodynamic states. In some embodiments, components or modules of system 700 may be distributed across multiple computing systems or devices.

Adaptive capacity constraint management system 700 is shown to include a communications interface 702 and a processing circuit 704. Communications interface 712 may include wired or wireless interfaces (e.g., jacks, antennas, transmitters, receivers, transceivers, wire terminals, etc.) for conducting data communications with various systems, devices, or networks. For example, communications interface 702 may include an Ethernet card and/or port for sending and receiving data via an Ethernet-based communications network. In some embodiments, communications interface 702 includes a wireless transceiver (e.g., a WiFi transceiver, a Bluetooth transceiver, a NFC transceiver, etc.) for communicating via a wireless communications network. Communications interface 702 may be configured to communicate via local area networks (e.g., a building LAN) and/or wide area networks (e.g., the Internet, a cellular network, a radio communication network, etc.) and may use a variety of communications protocols (e.g., BACnet, TCP/IP, point-to-point, etc.).

In some embodiments, communications interface 702 receives measurement inputs from sensors 710. Sensors 710 may include, for example, temperature sensor 438 configured to measure the temperature of the chilled water in loop 406 downstream of evaporator 418, temperature sensor 440 configured to measure the temperature of the condenser water in loop 408 downstream of condenser 420, temperature sensor 470 configured to measure the temperature of the condenser water in loop 408 upstream of condenser 420, temperature sensor 430 configured to measure the temperature of the refrigerant in compressor suction line 452, pressure sensor 432 configured to measure the pressure of the refrigerant in compressor suction line 452, temperature sensor 434 configured to measure the temperature of the refrigerant in compressor discharge line 442, pressure sensor 436 configured to measure the pressure of the refrigerant in compressor discharge line 442, and/or any other sensors configured to measure a thermodynamic property of the refrigerant in refrigeration circuit 404 or a thermodynamic property of a medium affected by refrigeration circuit 404 (e.g., a chilled water temperature, a chilled air temperature, a condenser water temperature, etc.).

Communications interface 702 may receive sensor inputs directly from sensors 710, via a local or remote communications network, and/or via an intermediary downstream controller 712. For example, if system 700 is implemented in supervisory controller 412 or enterprise controller 414, sensor inputs may be collected by a downstream controller 712 (e.g., chiller controller 410, a subplant level controller, etc.) and forwarded to system 700. In other embodiments, system 700 is implemented in chiller controller 410 and receives sensor inputs directly from sensors 710.

Communications interface 702 may facilitate communications between system 700, downstream controller 712, an upstream controller 714 and/or a client device 716. For example, system 700 may receive sensor inputs from downstream controller 712 via communications interface 702. System 700 may use the sensor inputs to determine an adjusted equipment capacity and may report a result of the capacity adjustment to upstream controller 714 or client device 716. Communications interface 702 may facilitate user interaction with system 700 via client device 716. For example, system 700 may generate updated equipment capacities and provide the updated capacities to client device 716 for presentation via a graphical user interface. Client device 716 may send commands to system 700, query system 700 for information, trigger an adaptive capacity adjustment process, view results of the capacity adjustment, or otherwise interact with system 700 via communications interface 702.

Still referring to FIG. 7, processing circuit 704 is shown to include a processor 706 and memory 708. Processor 706 may be a general purpose or specific purpose processor, an application specific integrated circuit (ASIC), one or more field programmable gate arrays (FPGAs), a group of processing components, or other suitable processing components. Processor 706 may be configured to execute computer code or instructions stored in memory 708 or received from other computer readable media (e.g., CDROM, network storage, a remote server, etc.) to perform one or more of the FDD processes described herein.

Memory 708 may include one or more data storage devices (e.g., memory units, memory devices, computer-readable storage media, etc.) configured to store data, computer code, executable instructions, or other forms of computer-readable information. Memory 708 may include random access memory (RAM), read-only memory (ROM), hard drive storage, temporary storage, non-volatile memory, flash memory, optical memory, or any other suitable memory for storing software objects and/or computer instructions. Memory 708 may include database components, object code components, script components, or any other type of information structure for supporting the various activities and information structures described in the present disclosure. Memory 708 may be communicably connected to processor 706 via processing circuit 704 and may include computer code for executing (e.g., by processor 706) one or more of the adaptive capacity adjustment processes described herein.

Still referring to FIG. 7, memory 708 is shown to include a parameter storage module 720. Parameter storage module 720 may be configured to store various parameters used by system 700 to perform the adaptive capacity adjustment processes described herein. Parameters stored in parameter storage module 720 may include, for example, an evaporator approach EA for evaporator 418, a condenser approach CA for condenser 420, a subcooler approach SCA for subcooler 446, or other parameters related to the operation of refrigeration circuit 404. The approach parameters stored in parameter storage module 720 may be based on manufacturer specifications and/or calculated from prior operating data.

In some embodiments, parameter storage module 720 stores measured variables representing the values of one or more thermodynamic properties of the refrigerant at various locations in refrigeration circuit 404, the chilled water in chilled water loop 406, and/or the condenser water in condenser water loop 408. For example, parameter storage module 720 may store a temperature $T_{cw,return}$ of the condenser water downstream of condenser 420 and a temperature $T_{cw,supply}$ of the condenser water upstream of condenser 420. Parameter storage module 720 may store a temperature $T_{chw,supply}$ of the chilled water downstream of evaporator 418 and a temperature $T_{chw,return}$ of the chilled water upstream of evaporator 418. Parameter storage module 720 may receive and store any value measured by sensors 710, as may be applicable for various types and locations of sensors 710.

Parameter storage module 720 may store calculated variables representing thermodynamic properties of the refrigerant (e.g., temperature, pressure, enthalpy, entropy, volumetric flow rate, density, etc.) at various locations in the refrigeration circuit. Calculated variables may include design values, expected values, actual values, isentropic values, isenthalpic values, or any combination thereof. For example, the design enthalpy and design entropy of the refrigerant at the inlet of evaporator 418 may be represented by the stored parameters $h_{r,in,des}$ and $s_{r,in,des}$, respectively. The design enthalpy and design entropy of the refrigerant at the outlet of evaporator 418 may be represented by the stored parameters $h_{r,out,des}$ and $s_{r,out,des}$, respectively. The design density and design volume flow rate of the refrigerant in evaporator 418 may be represented by the parameters $\rho_{r,des}$ and $\dot{V}_{r,des}$, respectively. The actual enthalpy and actual entropy of the refrigerant at the inlet of evaporator 418 may be represented by the stored parameters $h_{r,in,act}$ and $s_{r,in,act}$, respectively. The actual enthalpy and actual entropy of the refrigerant at the outlet of evaporator 418 may be represented by the stored parameters $h_{r,out,act}$ and $s_{r,out,act}$, respectively. The actual density and actual volume flow rate of the refrigerant in evaporator 418 may be represented by the parameters $\rho_{r,act}$ and $\dot{V}_{r,act}$, respectively. Parameter storage module 720 may store values for these and other parameters for use by the other modules of memory 708.

Still referring to FIG. 7, memory 708 is shown to include a sensor input module 722. Sensor input module 722 may obtain measured inputs from sensors 710 via communications interface 702, process the measured inputs, and store the processed inputs as measured values in parameter storage module 720. Variables generated by sensor input module 722 may include, for example, a temperature $T_{cw,return}$ of the condenser water downstream of condenser 420 and a temperature $T_{cw,supply}$ of the condenser water upstream of condenser 420, a temperature $T_{chw,supply}$ of the chilled water downstream of evaporator 418, and a temperature $T_{chw,return}$ of the chilled water upstream of evaporator 418.

In some embodiments, sensor input module 722 converts raw sensor data into a form that can be used by other modules of memory 708. For example, sensor input module 722 may translate a raw voltage value from one of sensors 710 into units of temperature or pressure (e.g., according to a conversion chart or formula). Sensor input module 722 may be configured to convert an analog data signal into discrete data points (e.g., by sampling the analog signal at predetermined intervals), add timing information to the data points, and store the discrete data points in parameter storage module 720. In some embodiments, sensor input module 722 annotates each data point with an indication of the sensor from which the data point was obtained, a type of data point (e.g., temperature, pressure, etc.), a time at which the data point was measured, and/or other information associated with the data point.

Still referring to FIG. 7, memory 708 is shown to include a state equation module 724. State equation module 724 may store state equations, charts, conversion formulas, tables, or other information that can be used to determine an unknown value for a thermodynamic property of the refrigerant based on one or more known thermodynamic values. For example, state equation module 724 may store a thermodynamic relationship that allows the actual enthalpy $h_{r,in,act}$ of the refrigerant at the inlet of evaporator 418 to be determined based on the actual temperature $T_{r,in,act}$ and/or the actual pressure $P_{r,in,act}$ of the refrigerant at the inlet of evaporator 418.

State equation module 724 may store state equations for determining an unknown thermodynamic value (e.g., entropy, enthalpy, temperature, pressure, etc.) of the refrigerant at a particular location in refrigeration circuit 404 as a function of one or more known values (e.g., a measured or calculated pressure, temperature, enthalpy, entropy, etc.) at the same location in refrigeration circuit 404. The state equations stored in state equation module 724 may be used by state modules 726-728 to determine design values and/or actual values for one or more thermodynamic properties of the refrigerant at various locations in the refrigeration circuit.

Still referring to FIG. 7, memory 708 is shown to include a design state module 726. Design state module 726 may be configured to determine (e.g., estimate, calculate, identify, retrieve, etc.) values for one or more thermodynamic properties of the refrigerant, the chilled water, and/or the condenser water at various locations within chilled water system 400 when system 400 is operated under design conditions. For example, under design conditions, evaporator 418 may receive the chilled fluid from chilled water loop 406 at a predetermined chilled water return temperature $T_{chw,return,des}$ (e.g., approximately 56° F.) and may cool the chilled fluid to a predetermined chilled water supply temperature $T_{chw,supply,des}$ (e.g., approximately 42° F.). Under design conditions, condenser 420 may receive a supply of condenser fluid from cooling tower 454 at a predetermined condenser water supply temperature $T_{cw,supply,des}$ (e.g., approximately 80° F.) and may heat the condenser fluid to a predetermined condenser water return temperature $T_{cw,return,des}$ (e.g., approximately 93° F.). Design state module 726 may retrieve the design temperatures $T_{chw,return,des}$, $T_{chw,supply,des}$, $T_{cw,return,des}$, and $T_{cw,supply,des}$ from parameter storage module 720 or any other data source.

In some embodiments, design state module 726 determines the temperature $T_{r,in\ des}$ of the refrigerant at the inlet of evaporator 418 under design conditions. Advantageously, design state module 726 may be configured to calculate the temperature $T_{r,in\ des}$ without requiring a direct measurement of the refrigerant temperature. For example, design state module 726 may apply a relationship between the condenser water supply temperature $T_{cw,supply,des}$ and the temperature $T_{r,sub,des}$ of the refrigerant at the outlet of subcooler 446 to calculate $T_{r,sub,des}$, as shown in the following equation:

$$T_{r,sub,des} = T_{cw,supply,des} + SCA$$

where $T_{cw,supply,des}$ is given by predetermined design conditions and SCA is a known approach of subcooler 446. The value of SCA may be retrieved from parameter storage module 720 and added to $T_{cw,supply,des}$ to calculate $T_{r,sub,des}$. The temperature $T_{r,sub,des}$ determined according to the preceding equation represents the temperature of the refrigerant at the outlet of subcooler 446 (i.e., in state 510) under design conditions.

Design state module 726 may use the temperature $T_{r,sub,des}$ to determine the enthalpy $h_{r,sub,des}$ of the refrigerant at the outlet of subcooler 446 (i.e., in state 510) under design conditions. For example, design state module 726 may use the following state equation to calculate the enthalpy $h_{r,sub,des}$ as a function of the temperature $T_{r,sub,des}$:

$$h_{r,sub,des} = h_{sat,l}(T_{r,sub,des})$$

where $h_{sat,l}(\ )$ is a function that returns the enthalpy of a saturated liquid refrigerant used in refrigeration circuit 404 (e.g., R134a) as a function of temperature. Design state module 726 may retrieve the function $h_{sat,l}(\ )$ from state equation module 724 for use in calculating the enthalpy $h_{r,sub,des}$.

Design state module 726 may use the enthalpy $h_{r,sub,des}$ of the refrigerant at the outlet of subcooler 446 to determine the enthalpy $h_{r,in,des}$ of the refrigerant at the inlet of evaporator 418 (i.e., in state 512) under design conditions. In some embodiments, the expansion that occurs between state 510 and state 512 is an isenthalpic expansion. Thus, the enthalpy $h_{r,sub,des}$ of the refrigerant in state 510 may be the same as the enthalpy $h_{r,in,des}$ of the refrigerant in state 512, as shown in the following equation:

$$h_{r,in,des} = h_{r,sub,des}$$

Design state module 726 may use a similar process to determine the temperature $T_{r,out\ des}$ of the refrigerant at the outlet of evaporator 418 under design conditions. For example, design state module 726 may apply a relationship between the chilled water supply temperature $T_{chw,supply,des}$ and the temperature $T_{r,out,des}$ of the refrigerant at the outlet of evaporator 418 to calculate $T_{r,out,des}$, as shown in the following equation:

$$T_{r,out,des} = T_{chw,supply,des} - EA$$

where $T_{chw,supply,des}$ is given by predetermined design conditions and EA is a known approach of evaporator 418. The value of EA may be retrieved from parameter storage module 720 and subtracted from $T_{chw,supply,des}$ to calculate $T_{r,out,des}$. The temperature $T_{r,out,des}$ determined according to the preceding equation represents the temperature of the refrigerant at the outlet of evaporator 418 (i.e., in state 502) under design conditions.

Design state module 726 may use the temperature $T_{r,out,des}$ to determine the enthalpy $h_{r,out,des}$ of the refrigerant at the outlet of evaporator 418 (i.e., in state 502) under design conditions. For example, design state module 726 may use the following state equation to calculate the enthalpy $h_{r,out,des}$ as a function of the temperature $T_{r,out,des}$:

$$h_{r,out,des} = h_{sat,g}(T_{r,out,des})$$

where $h_{sat,g}(\ )$ is a function that returns the enthalpy of a saturated vapor refrigerant used in refrigeration circuit 404 as a function of temperature. Design state module 726 may retrieve the function $h_{sat,g}(\ )$ from state equation module 724 for use in calculating the enthalpy $h_{r,out,des}$.

Design state module 726 may determine the enthalpy rise $h_{rise,des}$ across evaporator 418 under design conditions. The enthalpy rise $h_{rise,des}$ may be defined as the difference between the enthalpy $h_{r,out,des}$ of the refrigerant at the outlet of evaporator 418 (i.e., in state 502) and the enthalpy $h_{r,in,des}$ of the refrigerant at the inlet of evaporator 418 (i.e., in state 512) under design conditions. Design state module 726 may calculate the enthalpy rise $h_{rise,des}$ using the following equation:

$$h_{rise,des} = h_{r,out,des} - h_{r,in,des}$$

In some embodiments, design state module 726 determines the density $\rho_{r,evap,des}$ of the refrigerant in evaporator 418 under design conditions. The density $\rho_{r,evap,des}$ may be defined as the density of the refrigerant at the outlet of evaporator 418 (i.e., in state 502) when system 400 is operated under design conditions. Design state module 726 may use the temperature $T_{r,out,des}$ to determine the density $\rho_{r,evap,des}$ according to the following state equation:

$$\rho_{r,evap,des} = \rho_{sat,g}(T_{r,out,des})$$

where $\rho_{sat,g}(\ )$ is a function that returns the density of a saturated vapor refrigerant used in refrigeration circuit 404 as a function of temperature.

In some embodiments, design state module 726 determines the volumetric flow rate $\dot{V}_{r,comp,des}$ of the refrigerant through compressor 422 under design conditions. The volumetric flow rate $\dot{V}_{r,comp,des}$ may be defined as the flow rate of the refrigerant at the outlet of evaporator 418 or the inlet of compressor 422 (i.e., in state 502) when system 400 is operated under design conditions. The volumetric flow rate through compressor 422 can vary as a function of the isentropic head rise across compressor 422.

Figure 8:
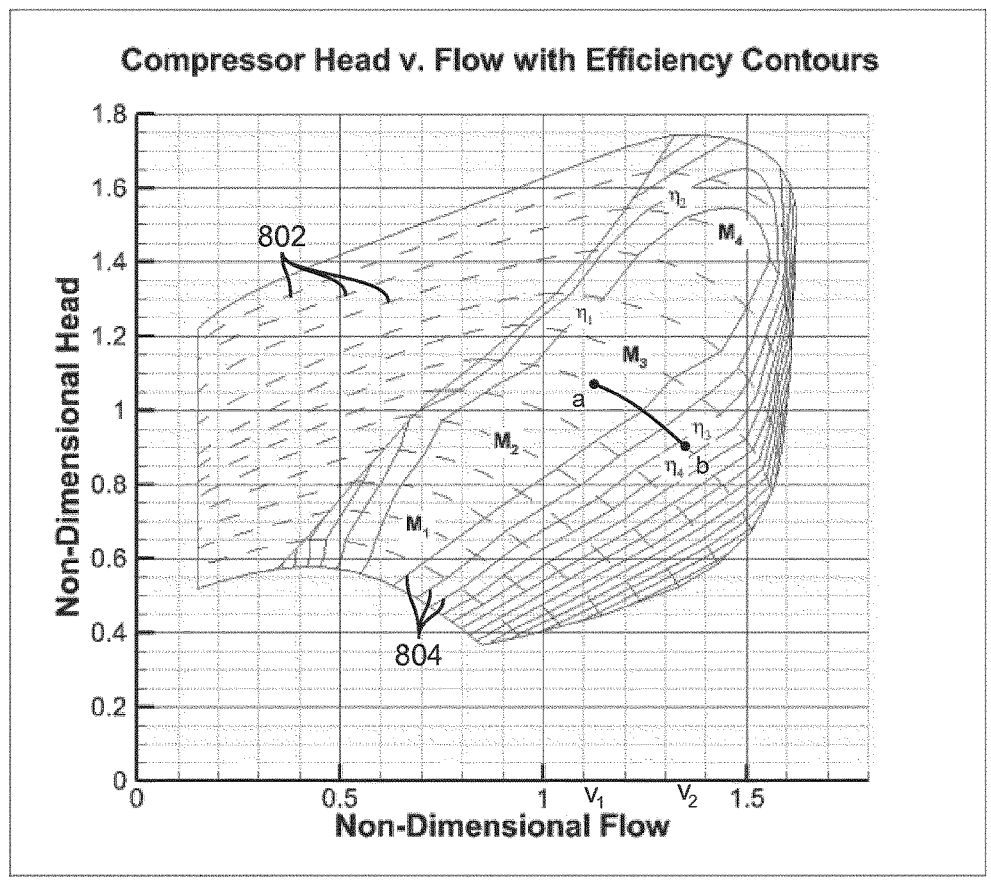
FIG. 8 is a compressor map that may be used by the system of FIG. 7 to identify a volumetric flow rate of a refrigerant in a refrigeration circuit, according to an exemplary embodiment.

Design state module 726 may use a compressor map to identify a relationship between a dimensionless flow rate $V_r$ of the refrigerant at the compressor suction and a dimensionless isentropic head rise $I_r$ of the refrigerant across compressor 422. In some embodiments, the dimensionless flow rate $V_r$ is normalized by a product of the speed of sound and a square of the impeller tip diameter for compressor 422. The dimensionless isentropic head rise $I_r$ may be normalized by the square of the speed of sound. The compressor map may provide a relationship between $V_r$ and $I_r$ at different Mach numbers at which the compressor can operate (e.g., the impeller tip speed divided by the speed of sound) and may be provided by a manufacturer of compressor 422 or derived from experimental data. An exemplary compressor map is shown in FIG. 8.

Design state module 726 may determine the isentropic head rise across compressor 422 under design conditions and use the compressor map to identify a volumetric flow rate $\dot{V}_{r,comp,des}$ corresponding to the determined isentropic head rise. In some embodiments, design state module 726 determines the isentropic head rise using design values for one or more thermodynamic properties of the refrigerant at the outlet of evaporator 418 (e.g., in state 502), the inlet of condenser 420 (e.g., in state 504), and/or other locations in refrigeration circuit 404.

Still referring to FIG. 7, memory 708 is shown to include an actual state module 728. Actual state module 728 may be configured to determine (e.g., estimate, calculate, identify, retrieve, etc.) values for one or more thermodynamic properties of the refrigerant, the chilled water, and/or the condenser water at various locations chilled water system 400 under actual operating conditions. Under actual operating conditions, evaporator 418 may receive the chilled fluid from chilled water loop 406 at an actual chilled water return temperature $T_{chw,return,act}$ and may cool the chilled fluid to an actual chilled water supply temperature $T_{chw,supply,act}$. Condenser 420 may receive a supply of condenser fluid from cooling tower 454 at an actual condenser water supply temperature $T_{cw,supply,act}$ and may heat the condenser fluid to an actual condenser water return temperature $T_{cw,return,act}$. The values for $T_{chw,return,act}$, $T_{chw,supply,act}$, $T_{cw,return,act}$, and $T_{cw,supply,act}$ may vary based on the actual thermal energy load of the building served by chilled water system 400 and/or various environmental factors (e.g., weather conditions, electric consumption within the building, heat transfer rates in cooling tower 454, etc.). Current operating values for $T_{chw,return,act}$, $T_{chw,supply,act}$, $T_{cw,return,act}$, and $T_{cw,supply,act}$ may be measured by sensors 710 and stored in parameter storage module 720.

In some embodiments, actual state module 728 determines the temperature $T_{r,in\ act}$ of the refrigerant at the inlet of evaporator 418 under actual operating conditions. Advantageously, actual state module 728 may be configured to calculate the temperature $T_{r,in\ act}$ without requiring a direct measurement of the refrigerant temperature. For example, actual state module 728 may apply a relationship between the condenser water supply temperature $T_{cw,supply,act}$ and the temperature $T_{r,sub,act}$ of the refrigerant at the outlet of subcooler 446 to calculate $T_{r,sub,act}$, as shown in the following equation:

$$T_{r,sub,act} = T_{cw,supply,act} + SCA$$

where $T_{cw,supply,act}$ is a measured or calculated value reflecting current operating conditions and SCA is a known approach of subcooler 446. The value of SCA may be retrieved from parameter storage module 720 and added to $T_{cw,supply,act}$ to calculate $T_{r,sub,act}$. The temperature $T_{r,sub,act}$ determined according to the preceding equation represents the temperature of the refrigerant at the outlet of subcooler 446 (i.e., in state 610) under actual operating conditions.

Actual state module 728 may use the temperature $T_{r,sub,act}$ to determine the enthalpy $h_{r,sub,act}$ of the refrigerant at the outlet of subcooler 446 (e.g., in state 610) under actual operating conditions. For example, actual state module 728 may use the following state equation to calculate the enthalpy $h_{r,sub,act}$ as a function of the temperature $T_{r,sub,act}$:

$$h_{r,sub,act} = h_{sat,l}(T_{r,sub,act})$$

where $h_{sat,l}(\ )$ is a function that returns the enthalpy of a saturated liquid refrigerant used in refrigeration circuit 404 as a function of temperature. Actual state module 728 may retrieve the function $h_{sat,l}(\ )$ from state equation module 724 for use in calculating the enthalpy $h_{r,sub,des}$.

Actual state module 728 may use the enthalpy $h_{r,sub,act}$ of the refrigerant at the outlet of subcooler 446 to determine the enthalpy $h_{r,in,act}$ of the refrigerant at the inlet of evaporator 418 (e.g., in state 612 or state 662) under actual operating conditions. In some embodiments, the expansion that occurs between state 610 and state 612 or state 662 is an isenthalpic expansion. Thus, the enthalpy $h_{r,sub,act}$ of the refrigerant in state 610 may be the same as the enthalpy $h_{r,in,act}$ of the refrigerant in state 612 or state 662, as shown in the following equation:

$$h_{r,in,act} = h_{r,sub,act}$$

Actual state module 728 may use a similar process to determine the temperature $T_{r,out\ act}$ of the refrigerant at the outlet of evaporator 418 under actual operating conditions. For example, actual state module 728 may apply a relationship between the chilled water supply temperature $T_{chw,supply,act}$ and the temperature $T_{r,out,act}$ of the refrigerant at the outlet of evaporator 418 to calculate $T_{r,out,act}$, as shown in the following equation:

$$T_{r,out,act} = T_{chw,supply,act} - EA$$

where $T_{chw,supply,act}$ is a measured or calculated value reflecting current operating conditions and EA is a known approach of evaporator 418. The value of EA may be retrieved from parameter storage module 720 and subtracted from $T_{chw,supply,act}$ to calculate $T_{r,out,act}$. The temperature $T_{r,out,act}$ determined according to the preceding equation represents the temperature of the refrigerant at the outlet of evaporator 418 (e.g., in state 652) under actual operating conditions.

Actual state module 728 may use the temperature $T_{r,out,act}$ to determine the enthalpy $h_{r,out,act}$ of the refrigerant at the outlet of evaporator 418 (e.g., in state 652) under actual operating conditions. For example, actual state module 728 may use the following state equation to calculate the enthalpy $h_{r,out,act}$ as a function of the temperature $T_{r,out,act}$:

$$h_{r,out,act} = h_{sat,g}(T_{r,out,act})$$

where $h_{sat,g}(\ )$ is a function that returns the enthalpy of a saturated vapor refrigerant used in refrigeration circuit 404 as a function of temperature. Actual state module 728 may retrieve the function $h_{sat,g}(\ )$ from state equation module 724 for use in calculating the enthalpy $h_{r,out,act}$.

Actual state module 728 may determine the enthalpy rise $h_{rise,act}$ across evaporator 418 under actual operating conditions. The enthalpy rise $h_{rise,act}$ may be defined as the difference between the enthalpy $h_{r,out,act}$ of the refrigerant at the outlet of evaporator 418 (e.g., in state 652) and the enthalpy $h_{r,in,act}$ of the refrigerant at the inlet of evaporator 418 (e.g., in state 612 or state 662) under actual operating conditions. Actual state module 728 may calculate the enthalpy rise $h_{rise,act}$ using the following equation:

$$h_{rise,act} = h_{r,out,act} - h_{r,in,act}$$

In some embodiments, actual state module 728 determines the density $\rho_{r,evap.act}$ of the refrigerant in evaporator 418 under actual operating conditions. The density $\rho_{r,evap.act}$ may be defined as the actual density of the refrigerant at the outlet of evaporator 418 (e.g., in state 652). Actual state module 728 may use the temperature $T_{r,out,act}$ to determine the density $\rho_{r,evap.act}$ according to the following state equation:

$$\rho_{r,evap.act} = \rho_{sat,g}(T_{r,out,act})$$

where $\rho_{sat,g}(\ )$ is a function that returns the density of a saturated vapor refrigerant used in refrigeration circuit 404 as a function of temperature.

In some embodiments, actual state module 728 determines the volumetric flow rate $\dot{V}_{r,comp,act}$ of the refrigerant through compressor 422 under actual conditions. The volumetric flow rate $\dot{V}_{r,comp,act}$ may be defined as the actual flow rate of the refrigerant at the outlet of evaporator 418 or the inlet of compressor 422 (e.g., in state 652). The volumetric flow rate through compressor 422 can vary as a function of the isentropic head rise across compressor 422.

Actual state module 728 may use a compressor map to identify a relationship between a dimensionless flow rate $V_r$ of the refrigerant at the compressor suction and a dimensionless isentropic head rise $I_r$ of the refrigerant across compressor 422, as described with reference to design state module 726. For example, actual state module 728 may determine the isentropic head rise across compressor 422 under actual operating conditions and use the compressor map to identify a volumetric flow rate $\dot{V}_{r,comp,act}$ corresponding to the determined isentropic head rise.

Still referring to FIG. 7, memory 708 is shown to include an enthalpy gain module 730, a density gain module 732, and a flow rate gain module 734. Enthalpy gain module 730 may be configured to determine an enthalpy gain factor $h_{gain}$ representing a gain in the enthalpy rise across evaporator 418 under actual operating conditions relative to design conditions. In some embodiments, the enthalpy gain factor $h_{gain}$ is a ratio of the enthalpy rise $h_{rise,act}$ of the refrigerant across evaporator 418 under actual operating conditions to the enthalpy rise $h_{rise,des}$ across evaporator 418 under design conditions. Enthalpy gain module 730 may calculate the enthalpy gain factor $h_{gain}$ using the following equation:

$$h_{gain} = \frac{h_{rise,act}}{h_{rise,des}}$$

where $h_{rise,act}$ is the actual enthalpy rise of the refrigerant across evaporator 418 as determined by actual state module 728 and $h_{rise,des}$ is the design enthalpy rise of the refrigerant across evaporator 418 as determined by design state module 726. In various embodiments, enthalpy gain module 730 may calculate the enthalpy gain factor $h_{gain}$ using any of a variety of functions of $h_{rise,act}$ and/or $h_{rise,des}$ (e.g., $h_{gain}=f(h_{rise,act}, h_{rise,des})$) such that $h_{gain}$ represents a change (e.g., a difference, a ratio, etc.) and/or operating error (e.g., a proportional error, an integral error, a differential error, etc.) in the actual enthalpy rise relative to design conditions.

Density gain module 732 may be configured to determine a density gain factor $\rho_{gain}$ representing a gain in the density of the refrigerant in evaporator 418 under actual operating conditions relative to design conditions. In some embodiments, the density gain factor $\rho_{gain}$ is a ratio of the density $\rho_{r,evap,act}$ of the refrigerant in evaporator 418 under actual operating conditions to the density $\rho_{r,evap,des}$ of the refrigerant in evaporator 418 under design conditions. Density gain module 732 may calculate the density gain factor $\rho_{gain}$ using the following equation:

$$\rho_{gain} = \frac{\rho_{r,evap,act}}{\rho_{r,evap,des}}$$

where $\rho_{r,evap,act}$ is the actual density of the refrigerant in evaporator 418 as determined by actual state module 728 and $\rho_{r,evap,des}$ is the design density of the refrigerant in evaporator 418 as determined by design state module 726. In various embodiments, density gain module 732 may calculate the density gain factor $\rho_{gain}$ using any of a variety of functions of $\rho_{r,evap,act}$ and/or $\rho_{r,evap,des}$ (e.g., $\rho_{gain}=f(\rho_{r,evap,act}, \rho_{r,evap,des})$) such that $\rho_{gain}$ represents a change (e.g., a difference, a ratio, etc.) and/or operating error (e.g., a proportional error, an integral error, a differential error, etc.) in the actual density of the refrigerant relative to design conditions.

Flow rate gain module 734 may be configured to determine a flow rate gain factor $\dot{V}_{gain}$ representing a gain in the volumetric flow rate of the refrigerant through compressor 422 under actual operating conditions relative to design conditions. In some embodiments, the flow rate gain factor $\dot{V}_{gain}$ is a ratio of the volumetric flow rate $\dot{V}_{r,comp,act}$ of the refrigerant through compressor 422 under actual operating conditions to the volumetric flow rate $\dot{V}_{r,comp,des}$ of the refrigerant through compressor 422 under design conditions. Flow rate gain module 734 may calculate the flow rate gain factor $\dot{V}_{gain}$ using the following equation:

$$\dot{V}_{gain} = \frac{\dot{V}_{r,comp,act}}{\dot{V}_{r,comp,des}}$$

where $\dot{V}_{r,comp,act}$ is the actual volumetric flow rate of the refrigerant through compressor 422 as determined by actual state module 728 and $\dot{V}_{r,comp,des}$ is the design volumetric flow rate of the refrigerant through compressor 422 as determined by design state module 726. In various embodiments, flow rate gain module 734 may calculate the flow rate gain factor $\dot{V}_{gain}$ using any of a variety of functions of $\dot{V}_{r,comp,act}$ and/or $\dot{V}_{r,comp,des}$ (e.g., $\dot{V}_{gain}=f(\dot{V}_{r,comp,act}, \dot{V}_{r,comp,des})$) such that $\dot{V}_{gain}$ represents a change (e.g., a difference, a ratio, etc.) and/or operating error (e.g., a proportional error, an integral error, a differential error, etc.) in the actual flow rate of the refrigerant relative to design conditions.

In some embodiments, memory 708 includes one or more additional gain modules configured to calculate gain factors for variables that affect the operating capacities of various different types of HVAC devices (e.g., heaters, pumps, fans, heat recovery chillers, rooftop units, etc.). For example, if the capacity Q of a HVAC device is a function of variables A, B, and C, memory 708 may include gain modules configured to calculate gain factors $A_{gain}$, $B_{gain}$, and $C_{gain}$ corresponding to variables A, B, and C. It is contemplated that the systems and methods of the present disclosure can be used to adaptively determine capacity limits for a wide variety of HVAC devices in addition to the chillers and refrigeration circuits as described in the exemplary embodiments.

Still referring to FIG. 7, memory 708 is shown to include a capacity gain module 736. Capacity gain module 736 may be configured to determine a capacity gain for chiller 402, refrigeration circuit 404 or any other HVAC device relative to design conditions. Capacity gain module 736 may calculate the capacity gain using one or more of the individual gain factors determined by modules 730-734 (e.g., $h_{gain}$, $\rho_{gain}$, $\dot{V}_{gain}$, etc.) or any other gain factors as may be applicable to different types of HVAC devices (e.g., a pressure rise gain across a compressor, an enthalpy drop gain across a condenser, a pressure drop gain across an expansion valve, etc.). The gain factors considered by capacity gain module 736 may represent changes in one or more variables that affect the capacity of the HVAC device for which the capacity gain is being determined.

Capacity gain module 736 may calculate the capacity gain $Q_{gain}$ for a HVAC device by combining one or more gain factors for variables that affect the capacity of the HVAC device. In some embodiments, capacity gain module 736 combines the gain factors in the same manner that the variables corresponding to the gain factors are combined in the capacity equation for the HVAC device. For example, the capacity Q of a chiller may be a product of the volumetric flow rate $\dot{V}_r$ of the refrigerant through a portion of the chiller, the density $\rho_r$ of the refrigerant, and the enthalpy rise $(h_{out}-h_{in})$ of the refrigerant across an evaporator as shown in the following equation:

$$Q=\dot{m}_r(h_{out}-h_{in})=\dot{m}_rT_{r,evap}(s_{out}-s_{in})=\dot{V}_r\rho_r(h_{out}-h_{in})$$

Thus, capacity gain module 736 may calculate the capacity gain $Q_{gain}$ for the chiller by multiplying the individual gain factors for volumetric flow rate, density, and enthalpy rise as shown in the following equation:

$$Q_{gain}=\dot{V}_{gain}\rho_{gain}h_{gain}$$

It is contemplated that any of a variety of different equations may be used to express the capacity of a chiller or any other HVAC device in terms of these and/or other operating variables. For example, the capacity of a chiller may alternatively be expressed in terms of the mass flow rate $\dot{m}_r$ of the refrigerant, the temperature $T_{r,evap}$ of the refrigerant in the evaporator, the enthalpy rise $(h_{out}-h_{in})$ of the refrigerant across the evaporator, and/or the entropy rise $(s_{out}-s_{in})$ of the refrigerant across the evaporator in other embodiments. Adaptive capacity constraint management system 700 may be configured to determine design values and actual values for a variety of different variables that affect the capacities of various HVAC devices. System 700 may calculate gain factors for one or more of such variables and combine the gain factors to generate the total capacity gain.

In some embodiments, combining the gain factors includes identifying the mathematical operations applied to the corresponding variables in the capacity equation and applying the same mathematical operations to the gain factors. For example, if the variables A, B, and C are multiplied in the capacity equation for a particular HVAC device (e.g., Q=ABC), the gain factors $A_{gain}$, $B_{gain}$, and $C_{gain}$ corresponding to variables A, B, and C may be multiplied to calculate the overall capacity gain $Q_{gain}$ (e.g., $Q_{gain}=A_{gain}B_{gain}C_{gain}$). If any of the variables are raised to a power in the capacity equation (e.g., $Q=A^2BC^{-1}$), the corresponding gain factors may be raised to the same power when calculating the capacity gain (e.g., $Q_{gain}=A_{gain}^2B_{gain}C_{gain}^{-1}$).

In some embodiments, capacity gain module 736 determines the capacity gain using the design capacity $Q_{des}$ of the HVAC device and the actual capacity $Q_{act}$ of the HVAC device. For example, capacity gain module 736 may use the actual values of the variables that affect capacity (e.g., as determined by actual state module 728) to calculate the actual capacity $Q_{act}$ of the device. Capacity gain module 736 may determine the capacity gain $Q_{gain}$ by taking the ratio of the actual capacity $Q_{act}$ to the design capacity $Q_{des}$, as shown in the following equation:

$$Q_{gain}=\frac{Q_{act}}{Q_{des}}$$

Still referring to FIG. 7, memory 708 is shown to include a capacity limit updating module 738 and a capacity limit reporting module 740. Capacity limit updating module 738 may be configured to determine a new or updated capacity limit for a HVAC device. The new capacity limit may be a function of a current design capacity $Q_{des}$ for the device and the capacity gain $Q_{gain}$ determined by capacity gain module 736. Capacity limit updating module 738 may receive the design capacity $Q_{des}$ from parameter storage module 720 or another data source (e.g., via communications interface 702) and apply the capacity gain $Q_{gain}$ to the design capacity to determine a new capacity limit $Q_{limit}$. In some embodiments, applying the capacity gain $Q_{gain}$ to the design capacity $Q_{des}$ includes multiplying the design capacity $Q_{des}$ by the capacity gain $Q_{gain}$, as shown in the following equation:

$$Q_{limit}=Q_{gain}Q_{des}$$

Capacity limit updating module 738 may store the updated capacity limit $Q_{limit}$ in memory 708. In some embodiments, capacity limit updating module 738 replaces the design capacity $Q_{des}$ with the updated capacity limit $Q_{limit}$. Advantageously, replacing the design capacity $Q_{des}$ with the updated capacity limit $Q_{limit}$ may enable external systems or devices that use the design capacity $Q_{des}$ of the HVAC device to instead use the updated capacity limit $Q_{limit}$. Using the updated capacity limit $Q_{limit}$ may facilitate more efficient operation of a system that uses a combination of HVAC devices, as described with reference to FIGS. 2-3B.

Capacity limit reporting module 740 may report the updated capacity limit $Q_{limit}$ to an external system or device via communications interface 702. For example, capacity limit reporting module 740 may report the updated capacity limit $Q_{limit}$ to a client device for presentation to a user. In some embodiments, capacity limit reporting module 740 reports the updated capacity limit $Q_{limit}$ to an optimization system or module that uses the updated capacity limit $Q_{limit}$ to select an optimal combination of HVAC devices for use in serving a thermal energy load. In other embodiments, equipment selection is performed by equipment selection module 742.

Still referring to FIG. 7, memory 708 is shown to include an equipment selection module 742. Equipment selection module 742 may determine an equipment on/off configuration and/or operating setpoints for various HVAC devices in order to satisfy a building load. The equipment on/off decisions and operating setpoints generated by equipment selection module 742 may be constrained by the capacity limits of the HVAC devices. Equipment selection module 742 may use the updated capacity limits determined by capacity limit updating module 738 to perform the equipment selection. In some instances, updating the capacity limits results in an increased capacity limit for a particular device or group of devices, relative to design conditions. Advantageously, the updated capacity limits may allow equipment selection module 742 to satisfy the building load using a more efficient combination of devices (e.g., a combination that consumes less power) relative to the most efficient combination allowed by the design capacity limits.

Referring now to FIG. 8, a compressor map 800 is shown, according to an exemplary embodiment. Compressor map 800 defines a relationship between the non-dimensional flow rate of a fluid (e.g., a refrigerant) through a compressor and a non-dimensional isentropic head rise across the compressor. In some embodiments, the non-dimensional flow rate is normalized by a product of the speed of sound and a square of the impeller tip diameter. The non-dimensional isentropic head rise may be normalized by the square of the speed of sound. Compressor map 800 may be provided by a manufacturer of the compressor or derived from experimental data.

Compressor map 800 is shown to include several dashed line compressor speed curves 802 and solid line efficiency curves 804. Each of curves 804 represents a constant isentropic efficiency $\eta_i$. Each of curves 802 represents a different speed (e.g., given by a Mach number $M_i$) at which the compressor can operate. For constant speed compressors, the operating point may always lie on a particular speed curve 802 defined by the constant operating speed of the compressor. However, other variables may cause the operating point to move along the curve 802. For example, compressor map 800 is shown to include a point a representing the operating point of compressor 422 under design conditions. Compressor map 800 indicates that point a corresponds to a first flow $V_1$. Point b represents the operating point of compressor 422 under actual operating conditions. Compressor map 800 indicates that point b corresponds to a second flow $V_2$.

Adaptive capacity constraint management system 700 may determine the isentropic head rise across compressor 422 under design conditions and/or actual operating conditions and use compressor map 800 to identify a volumetric flow rate corresponding to the determined isentropic head rise. The volumetric flow rates provided by compressor map 800 may be used by flow rate gain module 734 to determine the flow rate gain factor $\dot{V}_{gain}$, as described with reference to FIG. 7.

Figure 9:
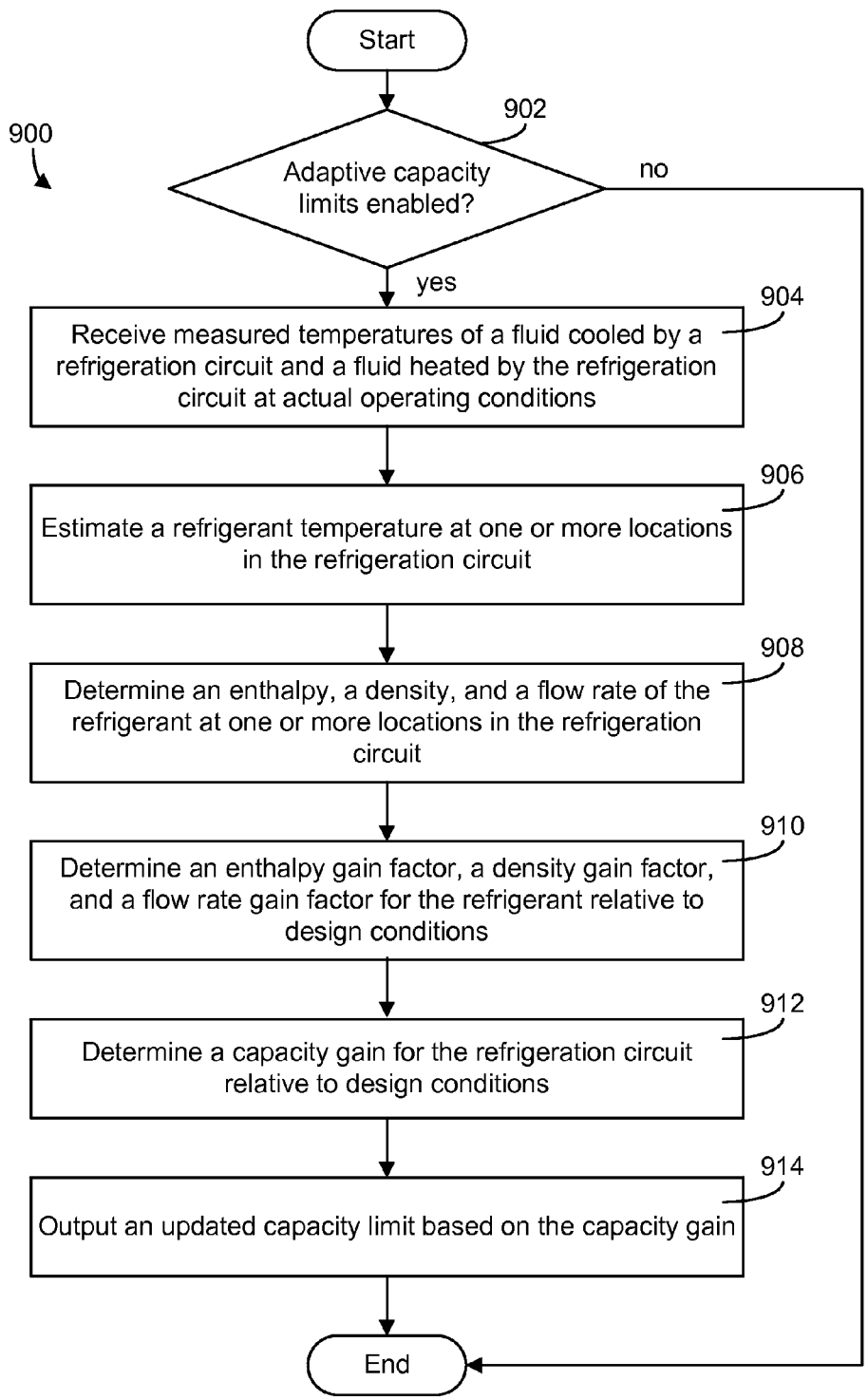
FIG. 9 is a flowchart of a process that may be performed by the system of FIG. 7 to adaptively adjust capacity limits in a refrigeration circuit, according to an exemplary embodiment.

Referring now to FIG. 9, a flowchart of a process 900 for adaptively adjusting capacity limits is shown, according to an exemplary embodiment. Process 900 may be used to adjust a capacity constraint for HVAC equipment that uses a refrigeration circuit to serve a thermal energy load (e.g., a chiller, a heat recovery chiller, an air handling unit with integrated cooling, etc.). In some embodiments, process 900 is performed by adaptive capacity constraint management system 700, as described with reference to FIG. 7.

Process 900 is shown to include determining whether adaptive capacity limits are enabled (step 902). In some embodiments, adaptive capacity limits can be selectively enabled or disabled via a configuration parameter stored in memory 708 (e.g., in parameter storage module 720). If adaptive capacity limits are not enabled, process 900 may end. However, if adaptive capacity limits are enabled, process 900 may proceed to steps 904-914.

Process 900 is shown to include receiving measured temperatures of a fluid cooled by a refrigeration circuit and a fluid heated by the refrigeration circuit at actual operating conditions (step 904). In some embodiments, the fluid cooled by the refrigeration circuit is chilled water in a chilled water loop (e.g., chilled water loop 406) and the fluid heated by the refrigeration circuit is condenser water in a condenser water loop (e.g., condenser water loop 408). In other embodiments, the fluids heated and cooled by the refrigeration circuit may include one or more different types of coolants, working fluids, refrigerants, or any other type of fluid capable of rejecting and/or absorbing heat from the refrigerant (e.g., air, glycol, CO2, etc.). In some embodiments, the temperature of the fluid cooled by the refrigeration circuit is measured at a location downstream of an evaporator of the refrigeration circuit. The temperature of the fluid heated by the refrigeration circuit may be measured at a location upstream and/or downstream of a condenser of the refrigeration circuit.

Still referring to FIG. 9, process 900 is shown to include estimating a refrigerant temperature at one or more locations in the refrigeration circuit (step 906). Step 906 may include using the measured temperatures of the fluids heated and cooled by the refrigeration circuit to determine a temperature $T_{r,in}$ of the refrigerant upstream of the evaporator and a temperature $T_{r,out}$ of the refrigerant downstream of the evaporator. The temperature $T_{r,out}$ of the refrigerant downstream of the evaporator may be determined by subtracting an evaporator approach EA from the measured temperature $T_{chw,supply}$ of the fluid cooled by the refrigeration circuit downstream of the evaporator as shown in the following equation:

$$T_{r,out} = T_{chw,supply} - EA$$

For embodiments in which the refrigeration circuit includes a subcooler downstream of the condenser, the temperature $T_{r,in}$ may represent the temperature of the refrigerant at the outlet of the subcooler (i.e., point 510 in FIG. 5). The temperature $T_{r,in}$ may be determined by adding a subcooler approach SCA to the measured temperature $T_{cw,supply}$ of the fluid heated by the refrigeration circuit upstream of the condenser, as shown in the following equation:

$$T_{r,in} = T_{cw,supply} + SCA$$

where $T_{r,in}$ represents the temperature of the refrigerant at the outlet of the subcooler.

For embodiments in which the refrigeration circuit does not include a subcooler, the temperature $T_{r,in}$ of the refrigerant upstream of the evaporator may be determined by adding a condenser approach CA to the measured temperature $T_{cw,return}$ of the fluid heated by the refrigeration circuit downstream of the condenser, as shown in the following equation:

$$T_{r,in} = T_{cw,return} + CA$$

where $T_{r,in}$ represents the temperature of the refrigerant at the outlet of the condenser.

Still referring to FIG. 9, process 900 is shown to include determining an enthalpy, a density, and a flow rate of the refrigerant at one or more locations in the refrigeration circuit (step 908). Step 908 may include using the temperature $T_{r,in}$ of the refrigerant at the outlet of the subcooler to determine the enthalpy $h_{r,in}$ of the refrigerant at the outlet of the subcooler under actual operating conditions. For example, step 908 may include using the following state equation to calculate the enthalpy $h_{r,in}$ as a function of the temperature $T_{r,in}$:

$$h_{r,in} = h_{sat,l}(T_{r,in})$$

where $h_{sat,l}(\ )$ is a function that returns the enthalpy of a saturated liquid refrigerant used in the refrigeration circuit as a function of temperature. The value $h_{r,in}$ calculated by the preceding equation represents the enthalpy of the refrigerant at the inlet of the expansion valve, which may be equal to the enthalpy of the refrigerant at the inlet of the evaporator for isenthalpic expansion processes. Advantageously, the enthalpy $h_{r,in}$ of the refrigerant at the inlet of the expansion valve can be used as the enthalpy of the refrigerant at the inlet of the evaporator since the expansion process is isenthalpic. The enthalpy of the refrigerant at the inlet of the evaporator can then be used in conjunction with the temperature of the refrigerant at the inlet of the evaporator to calculate the entropy or other thermodynamic properties of the refrigerant at the inlet of the evaporator.

Step 908 may include using the temperature $T_{r,out}$ of the refrigerant at the outlet of the evaporator to determine the enthalpy $h_{r,out}$ of the refrigerant at the outlet of the evaporator under actual operating conditions. For example, step 908 may include using the following equation to calculate the enthalpy $h_{r,out}$ as a function of the temperature $T_{r,out}$:

$$h_{r,out} = h_{sat,g}(T_{r,out})$$

where $h_{sat,g}( )$ is a function that returns the enthalpy of a saturated vapor refrigerant used in the refrigeration circuit as a function of temperature.

In some embodiments, step 908 includes determining the enthalpy rise $h_{rise}$ across the evaporator under actual operating conditions. The enthalpy rise $h_{rise}$ may be defined as the difference between the enthalpy $h_{r,out}$ of the refrigerant at the outlet of the evaporator and the enthalpy $h_{r,in}$ of the refrigerant at the inlet of the evaporator 418 under actual operating conditions. The enthalpy rise $h_{rise}$ may be calculated using the following equation:

$$h_{rise} = h_{r,out} - h_{r,in}$$

Step 908 may include determining the density $\rho_{r,evap}$ of the refrigerant in the evaporator under actual operating conditions. The density $\rho_{r,evap}$ may be defined as the actual density of the refrigerant at the outlet of the evaporator. Step 908 may include using the temperature $T_{r,out}$ to determine the density $\rho_{r,evap}$ according to the following state equation:

$$\rho_{r,evap} = \rho_{sat,g}(T_{r,out})$$

where $\rho_{sat,g}( )$ is a function that returns the density of a saturated vapor refrigerant used in the refrigeration circuit as a function of temperature.

Step 908 may include determining the volumetric flow rate $\dot{V}_{r,comp}$ of the refrigerant through a compressor of the refrigeration circuit under actual conditions. The volumetric flow rate $\dot{V}_{r,comp}$ may be defined as the actual flow rate of the refrigerant at the outlet of the evaporator or the inlet of the compressor. The volumetric flow rate through the compressor can vary as a function of the isentropic head rise across the compressor.

In some embodiments, step 908 includes using a compressor map to identify a relationship between a dimensionless flow rate $V_r$ of the refrigerant at the compressor suction and a dimensionless isentropic head rise $I_r$ of the refrigerant across the compressor, as described with reference to FIGS. 7-8. For example, step 908 may include determining the isentropic head rise across the compressor under actual operating conditions and use the compressor map to identify a volumetric flow rate $\dot{V}_{r,comp}$ corresponding to the determined isentropic head rise.

Still referring to FIG. 9, process 900 is shown to include determining an enthalpy gain factor, a density gain factor, and a flow rate gain factor for the refrigerant relative to design conditions (step 910). In some embodiments, the enthalpy gain factor $h_{gain}$ is a ratio of the enthalpy rise $h_{rise,act}$ of the refrigerant across the evaporator under actual operating conditions to the enthalpy rise $h_{rise,des}$ across the evaporator under design conditions. Step 910 may include calculating the enthalpy gain factor $h_{gain}$ using the following equation:

$$h_{gain} = \frac{h_{rise,act}}{h_{rise,des}}$$

where $h_{rise,act}$ is the actual enthalpy rise of the refrigerant across the evaporator as determined in step 908 and $h_{rise,des}$ is the design enthalpy rise of the refrigerant across the evaporator.

In some embodiments, the density gain factor $\rho_{gain}$ is a ratio of the density $\rho_{r,evap,act}$ of the refrigerant in the evaporator under actual operating conditions to the density $\rho_{r,evap,des}$ of the refrigerant in the evaporator under design conditions. Step 910 may include calculating the density gain factor $\rho_{gain}$ using the following equation:

$$\rho_{gain} = \frac{\rho_{r,evap,act}}{\rho_{r,evap,des}}$$

where $\rho_{r,evap,act}$ is the actual density of the refrigerant in the evaporator 418 as determined in step 908 and $\rho_{r,evap,des}$ is the design density of the refrigerant in the evaporator.

In some embodiments, the flow rate gain factor $\dot{V}_{gain}$ is a ratio of the volumetric flow rate $\dot{V}_{r,comp,act}$ of the refrigerant through the compressor under actual operating conditions to the volumetric flow rate $\dot{V}_{r,comp,des}$ of the refrigerant through the compressor under design conditions. Step 910 may include calculating the flow rate gain factor $\dot{V}_{gain}$ using the following equation:

$$\dot{V}_{gain} = \frac{\dot{V}_{r,comp,act}}{\dot{V}_{r,comp,des}}$$

where $\dot{V}_{r,comp,act}$ is the actual volumetric flow rate of the refrigerant through the compressor as determined in step 908 and $\dot{V}_{r,comp,des}$ is the design volumetric flow rate of the refrigerant through the compressor 422.

Still referring to FIG. 9, process 900 is shown to include determining a capacity gain for the refrigeration circuit relative to design conditions (step 912) and outputting an updated capacity limit based on the capacity gain. Step 912 may include calculating the capacity gain $Q_{gain}$ for the refrigeration circuit by multiplying the individual gain factors for volumetric flow rate, density, and enthalpy rise as shown in the following equation:

$$Q_{gain} = \dot{V}_{gain} \rho_{gain} h_{gain}$$

Step 914 may include determining a new or updated capacity limit for the refrigeration circuit based on a current design capacity $Q_{des}$ for the refrigeration circuit and the capacity gain $Q_{gain}$ determined in step 912. In some embodiments, step 914 includes multiplying the design capacity $Q_{des}$ by the capacity gain $Q_{gain}$, as shown in the following equation:

$$Q_{limit} = Q_{gain} Q_{des}$$

Step 914 may include storing the updated capacity limit $Q_{limit}$ in memory and/or replacing the design capacity $Q_{des}$ with the updated capacity limit $Q_{limit}$. Advantageously, replacing the design capacity $Q_{des}$ with the updated capacity limit $Q_{limit}$ may enable external systems or devices that use the design capacity $Q_{des}$ of the refrigeration circuit to instead use the updated capacity limit $Q_{limit}$. Using the updated capacity limit $Q_{limit}$ may facilitate more efficient operation of a system that uses a combination of devices, as described with reference to FIGS. 2-3B.

Step 914 may include reporting the updated capacity limit $Q_{limit}$ to an external system or device. For example, step 914 may include reporting the updated capacity limit $Q_{limit}$ to a client device for presentation to a user. In some embodiments, step 914 includes reporting the updated capacity limit $Q_{limit}$ to an optimization system or module that uses the updated capacity limit $Q_{limit}$ to select an optimal combination of HVAC devices for use in serving a thermal energy load.

Figure 10:
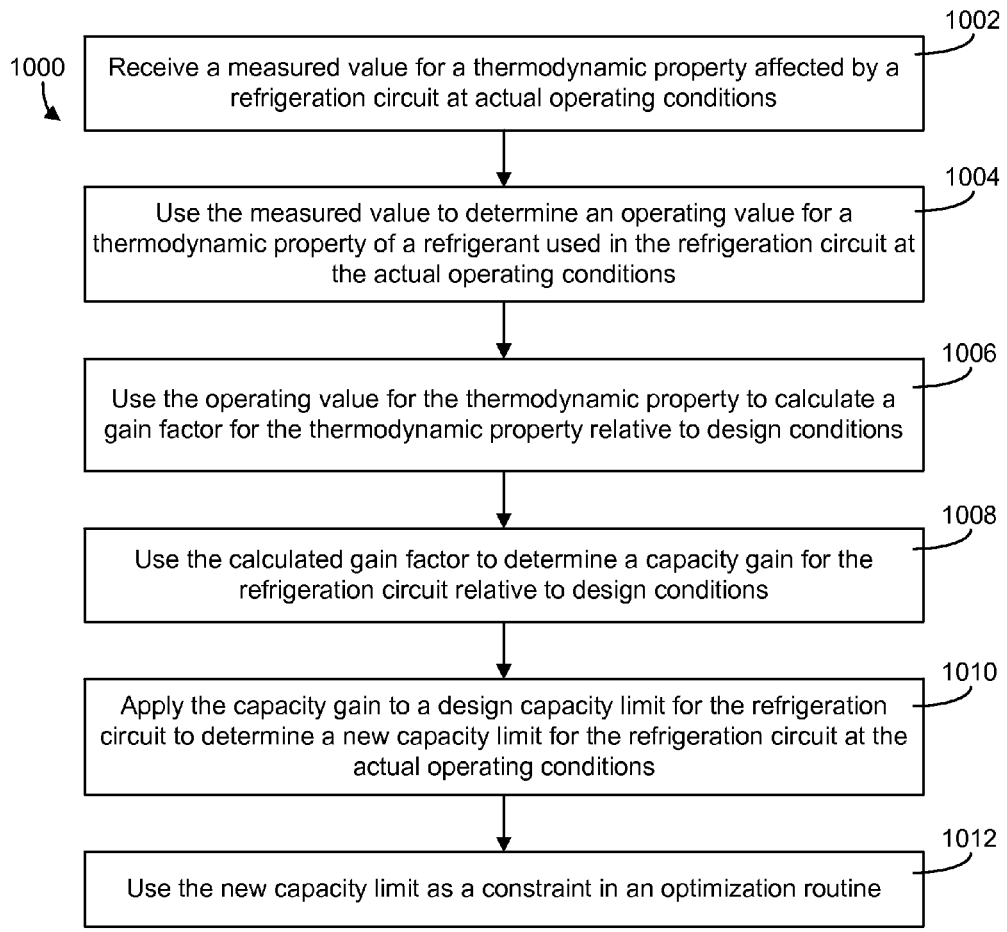
FIG. 10 is a flowchart of another process that may be performed by the system of FIG. 7 to adaptively adjust capacity limits in a refrigeration circuit, according to an exemplary embodiment.

Referring now to FIG. 10, a flowchart of another process 1000 for adaptively adjusting capacity limits is shown, according to an exemplary embodiment. Process 1000 may be used to adjust a capacity constraint for HVAC equipment that uses a refrigeration circuit to serve a thermal energy load (e.g., a chiller, a heat recovery chiller, an air handling unit with integrated cooling, etc.). In some embodiments, process 1000 is performed by adaptive capacity constraint management system 700, as described with reference to FIG. 7.

Process 1000 is shown to include receiving a measured value for a thermodynamic property affected by a refrigeration circuit at actual operating conditions (step 1002). In various embodiments, the thermodynamic property affected by the refrigeration circuit may be the temperature of a fluid cooled or heated by the refrigeration circuit (as described with reference to FIG. 9) or any other thermodynamic property affected by the refrigeration circuit (e.g., pressure, flow rate, enthalpy, entropy, density, etc.). Step 1002 may include measuring one or more thermodynamic properties at one or more locations within the refrigeration circuit or external to the refrigeration circuit.

Process 1000 is shown to include using the measured value to determine an operating value for a thermodynamic property of a refrigerant used in the refrigeration circuit at the actual operating conditions (step 1004). Step 1004 may be performed in a similar manner to steps 906-908 of process 900. The thermodynamic property of the refrigerant used in the refrigeration circuit may be a temperature of the refrigerant, an enthalpy of the refrigerant, an entropy of the refrigerant, a density of the refrigerant, a flow rate of the refrigerant, or any other property of the refrigerant. Step 1004 may include calculating one or more thermodynamic properties of the refrigerant at one or more locations within the refrigeration circuit.

Still referring to FIG. 10, process 1000 is shown to include using the operating value for the thermodynamic property to calculate a gain factor for the thermodynamic property relative to design conditions (step 1006). Step 1006 may be performed in a similar manner to step 910 of process 900. In some embodiments, step 1006 includes calculating gain factors for variables that affect the operating capacity of the refrigeration circuit. For example, if the capacity Q the refrigeration circuit is a function of variables A, B, and C, step 1006 may include calculating gain factors $A_{gain}$, $B_{gain}$, and $C_{gain}$ corresponding to variables A, B, and C.

Process 1000 is shown to include using the calculated gain factor to determine a capacity gain for the refrigeration circuit relative to design conditions (step 1008). In some embodiments, step 1008 includes combining a plurality of gain factors calculated in step 1006. Combining the gain factors may include identifying the mathematical operations applied to the corresponding variables in a capacity equation for the refrigeration circuit and applying the same mathematical operations to the gain factors. For example, if the variables A, B, and C are multiplied in the capacity equation used to determine the capacity Q of the refrigeration circuit (e.g., Q=ABC), the gain factors $A_{gain}$, $B_{gain}$, and $C_{gain}$ corresponding to variables A, B, and C may be multiplied to calculate the overall capacity gain $Q_{gain}$ (e.g., $Q_{gain}=A_{gain}B_{gain}C_{gain}$). If any of the variables are raised to a power in the capacity equation (e.g., $Q=A^2BC^{-1}$), the corresponding gain factors may be raised to the same power when calculating the capacity gain (e.g., $Q_{gain}=A_{gain}^2B_{gain}C_{gain}^{-1}$).

Still referring to FIG. 10, process 1000 is shown to include applying the capacity gain to a design capacity limit for the refrigeration circuit to determine a new capacity limit for the refrigeration circuit at the actual operating conditions (step 1010). Step 1010 may include determining a new or updated capacity limit for the refrigeration circuit based on a current design capacity $Q_{des}$ for the refrigeration circuit and the capacity gain $Q_{gain}$ determined in step 1008. In some embodiments, step 1010 includes multiplying the design capacity $Q_{des}$ by the capacity gain $Q_{gain}$ (e.g., $Q_{limit}=Q_{gain}Q_{des}$).

Process 1000 is shown to include using the new capacity limit as a constraint in an optimization routine (step 1012). In some embodiments, the optimization routine optimizes an amount of power consumed by one or more HVAC devices to satisfy a given thermal energy load. Step 1012 may include determining an equipment on/off configuration and/or operating setpoints for various HVAC devices in order to satisfy the thermal energy load. The equipment on/off decisions and operating setpoints generated may be constrained by the capacity limits of the HVAC devices.

In some instances, the new capacity limit generated in step 1010 is an increased capacity limit for a particular device or group of devices, relative to design conditions. Advantageously, the new capacity limit may allow the thermal energy load to be satisfied using a more efficient combination of devices (e.g., a combination that consumes less power) than would be achievable using the design capacity limit. For example, the amount of power consumed by the HVAC devices to satisfy the thermal energy load when constrained by the new capacity limit may be less than an optimal amount of power consumed by the HVAC devices to satisfy the same thermal energy load when constrained by a previous design capacity limit.

Figure 11:
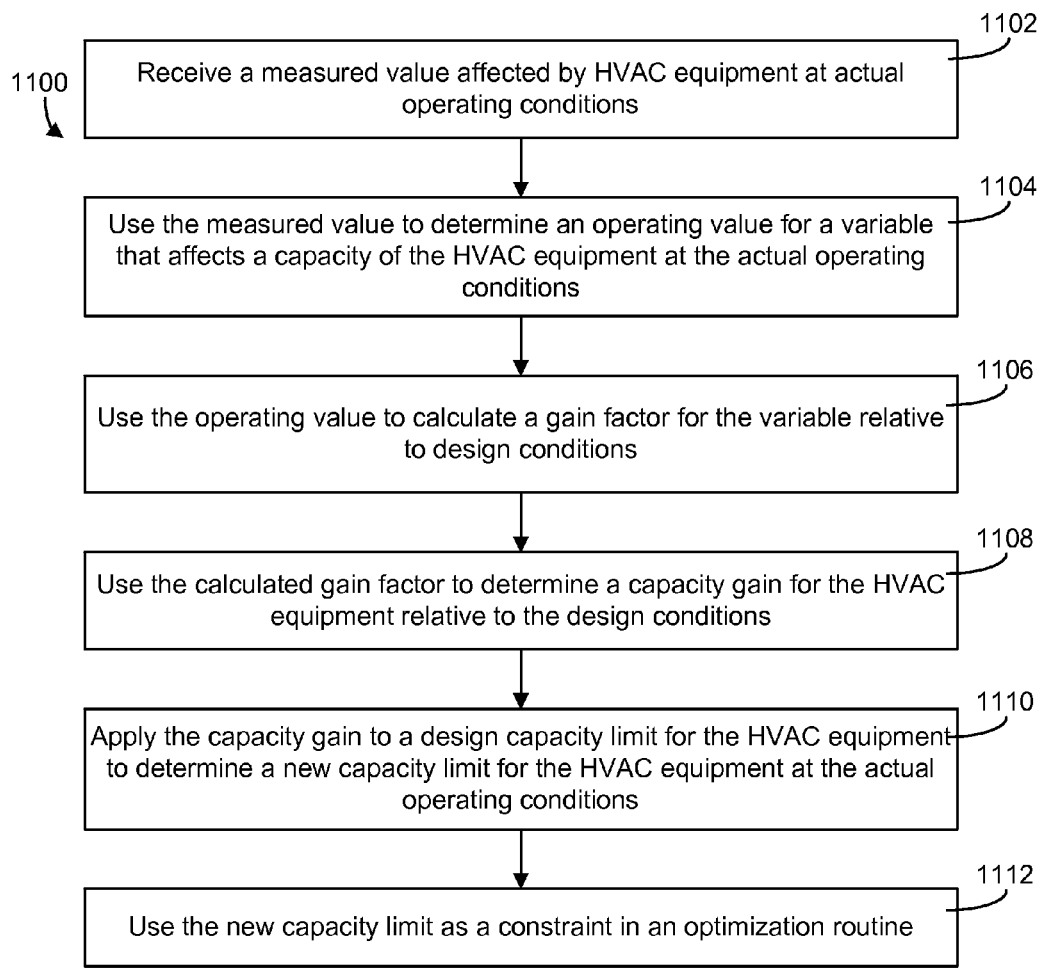
FIG. 11 is a flowchart of a process that may be performed by the system of FIG. 7 to adaptively adjust capacity limits for various types of HVAC devices, according to an exemplary embodiment.

Referring now to FIG. 11, a flowchart of a process 1100 for adaptively adjusting capacity limits is shown, according to an exemplary embodiment. Process 1100 may be used to adjust a capacity constraint for various types of HVAC equipment (e.g., heaters, chillers, pumps, air handling units, etc.). Process 1100 is a more general application of process 1000 that can be used to adjust the capacity limits of many different types of HVAC equipment with or without a refrigeration circuit. In some embodiments, process 1100 is performed by adaptive capacity constraint management system 700, as described with reference to FIG. 7.

Many of the steps of process 1100 are the same or similar to the corresponding steps of process 1000. For example, process 1100 is shown to include receiving a measured value affected by HVAC equipment at actual operating conditions (step 1102) and using the measured value to determine an operating value for a variable that affect a capacity of the HVAC equipment at the actual operating conditions (step 1104). Process 1100 may include using the operating value to calculate a gain factor for the variable relative to design conditions (step 1106) and using the calculated gain factor to determine a capacity gain for the HVAC equipment relative to the design conditions (step 1108). Process 1100 may further include applying the capacity gain to a design capacity limit for the HVAC equipment to determine a new capacity limit for the HVAC equipment at the actual operating conditions (step 1110) and using the new capacity limit as a constraint in an optimization routine (step 1112). It is contemplated that process 1100 can be used to adaptively determine new capacity limits for various types of HVAC equipment in addition to chillers and refrigeration circuits.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on memory or other machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products or memory comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An adaptive capacity constraint management system comprising:
   a communications interface configured to receive a measured value for a thermodynamic property affected by a refrigeration circuit at actual operating conditions; and
   a processing circuit coupled to the communications interface, the processing circuit comprising:
      an actual state module that uses the measured value to determine an operating value for a thermodynamic property of a refrigerant used in the refrigeration circuit at the actual operating conditions;
      a gain module that uses the operating value for the thermodynamic property of the refrigerant to calculate a gain factor for the thermodynamic property of the refrigerant relative to design conditions;
      a capacity gain module that uses the calculated gain factor to determine a capacity gain for the refrigeration circuit relative to the design conditions;
      a capacity limit updating module that applies the capacity gain to a design capacity limit for equipment in the refrigeration circuit to determine a new capacity limit for the equipment at the actual operating conditions; and
      an equipment selection module that uses the new capacity limit as a constraint in an optimization routine that selects one or more devices used to satisfy a thermal energy load.

2. The adaptive capacity constraint management system of claim 1, wherein the thermodynamic property affected by the refrigeration circuit comprises at least one of:
   a measured temperature of a chilled fluid that rejects heat to the refrigerant in an evaporator of the refrigeration circuit; and
   a measured temperature of a heated fluid that absorbs heat from the refrigerant in a condenser of the refrigeration circuit.

3. The adaptive capacity constraint management system of claim 2, wherein using the measured value to determine an operating value for the thermodynamic property of the refrigerant comprises at least one of:
   estimating at least one of an inlet enthalpy and an inlet entropy of the refrigerant at an inlet of an evaporator of the refrigeration circuit; and
   estimating at least one of an outlet enthalpy and an outlet entropy of the refrigerant at an outlet of the evaporator.

4. The adaptive capacity constraint management system of claim 3, wherein estimating the inlet enthalpy comprises:
   using the measured temperature of the heated fluid to estimate a temperature of the refrigerant at an inlet of an expansion valve of the refrigeration circuit;
   using the estimated temperature of the refrigerant to estimate an enthalpy of the refrigerant at the inlet of the expansion valve; and
   using the estimated enthalpy of the refrigerant at the inlet of the expansion valve as the inlet enthalpy.

5. The adaptive capacity constraint management system of claim 3, wherein estimating at least one of the outlet enthalpy and the outlet entropy comprises:
   using the measured temperature of the chilled fluid to estimate a temperature of the refrigerant at the outlet of the evaporator; and
   using the estimated temperature of the refrigerant to estimate at least one of the outlet enthalpy and the outlet entropy.

6. The adaptive capacity constraint management system of claim 1, wherein the thermodynamic property of the refrigerant is a volumetric flow rate of the refrigerant and wherein calculating a gain factor for the volumetric flow rate of the refrigerant relative to design conditions comprises:
   determining an isentropic head across a compressor of the refrigeration circuit at the actual operating conditions;
   using a compressor map to determine a volumetric flow rate of the refrigerant that corresponds to the isentropic head across the compressor at the actual operating conditions; and
   calculating a ratio between the determined volumetric flow rate of the refrigerant at the actual operating conditions and a volumetric flow rate of the refrigerant at the design conditions.

7. The adaptive capacity constraint management system of claim 1, wherein the thermodynamic property of the refrigerant is a density of the refrigerant and wherein calculating a gain factor for the density of the refrigerant relative to design conditions comprises:
  determining at least one of a temperature and a pressure of the refrigerant in the evaporator at the actual operating conditions;
  using at least one of the temperature and the pressure of the refrigerant in the evaporator to determine a density of the refrigerant in the evaporator at the actual operating conditions; and
  calculating a ratio between the determined density of the refrigerant at the actual operating conditions and a density of the refrigerant at the design conditions.

8. The adaptive capacity constraint management system of claim 1, wherein the thermodynamic property of the refrigerant is an enthalpy rise of the refrigerant across an evaporator of the refrigeration circuit and wherein calculating a gain factor for the enthalpy rise of the refrigerant relative to design conditions comprises:
  determining a first difference between an enthalpy of the refrigerant at an outlet of the evaporator and an enthalpy of the refrigerant at an inlet of the evaporator at the actual operating conditions;
  determining a second difference between an enthalpy of the refrigerant at an outlet of the evaporator and an enthalpy of the refrigerant at an inlet of the evaporator at the design conditions; and
  calculating a ratio between the first difference and the second difference.

9. The adaptive capacity constraint management system of claim 1, wherein determining a capacity gain for the refrigeration circuit relative to the design conditions comprises combining a plurality of gain factors for individual properties of the refrigerant to calculate a total capacity gain.

10. The adaptive capacity constraint management system of claim 1, wherein:
  the optimization routine optimizes an amount of power consumed by the one or more devices in satisfying the thermal energy load subject to the new capacity limit; and
  the amount of power consumed by the one or more devices in satisfying the thermal energy subject to the new capacity limit is less than an optimal amount of power consumed by the one or more devices in satisfying the same thermal energy load subject to the design capacity limit.

11. A method for determining a capacity limit of equipment in a refrigeration circuit, the method comprising:
  receiving, at a processing circuit, a measured value for a thermodynamic property affected by the refrigeration circuit at actual operating conditions;
  using the measured value to determine, by an actual state module of the processing circuit, an operating value for a thermodynamic property of a refrigerant used in the refrigeration circuit at the actual operating conditions;
  using the operating value for the thermodynamic property of the refrigerant to calculate, by a gain module of the processing circuit, a gain factor for the thermodynamic property of the refrigerant relative to design conditions;
  using the calculated gain factor to determine, by a capacity gain module of the processing circuit, a capacity gain for the refrigeration circuit relative to the design conditions;
  applying the capacity gain to a design capacity limit for the equipment to determine, by a capacity limit updating module of the processing circuit, a new capacity limit for the equipment at the actual operating conditions; and
  using the new capacity limit as a constraint in an optimization routine that selects one or more devices used to satisfy a thermal energy load.

12. The method of claim 11, wherein the thermodynamic property affected by the refrigeration circuit comprises at least one of:
  a measured temperature of a chilled fluid that rejects heat to the refrigerant in an evaporator of the refrigeration circuit; and
  a measured temperature of a heated fluid that absorbs heat from the refrigerant in a condenser of the refrigeration circuit.

13. The method of claim 12, wherein using the measured value to determine an operating value for the thermodynamic property of the refrigerant comprises at least one of:
  estimating at least one of an inlet enthalpy and an inlet entropy of the refrigerant at an inlet of an evaporator of the refrigeration circuit; and
  estimating at least one of an outlet enthalpy and an outlet entropy of the refrigerant at an outlet of the evaporator.

14. The method of claim 13, wherein estimating the inlet enthalpy comprises:
  using the measured temperature of the heated fluid to estimate a temperature of the refrigerant at an inlet of an expansion valve of the refrigeration circuit;
  using the estimated temperature of the refrigerant to estimate an enthalpy of the refrigerant at the inlet of the expansion valve; and
  using the estimated enthalpy of the refrigerant at the inlet of the expansion valve as the inlet enthalpy.

15. The method of claim 13, wherein estimating at least one of the outlet enthalpy and the outlet entropy comprises:
  using the measured temperature of the chilled fluid to estimate a temperature of the refrigerant at the outlet of the evaporator; and
  using the estimated temperature of the refrigerant to estimate at least one of the outlet enthalpy and the outlet entropy.

16. The method of claim 11, wherein determining a capacity gain for the refrigeration circuit relative to the design conditions comprises combining a plurality of gain factors for individual properties of the refrigerant to calculate a total capacity gain.

17. The method of claim 11, wherein:
  the optimization routine optimizes an amount of power consumed by the one or more devices in satisfying the thermal energy load subject to the new capacity limit; and
  the amount of power consumed by the one or more devices in satisfying the thermal energy subject to the new capacity limit is less than an optimal amount of power consumed by the one or more devices in satisfying the same thermal energy load subject to the design capacity limit.

18. An adaptive capacity constraint management system comprising:
  a communications interface configured to receive a measured value affected by HVAC equipment at actual operating conditions; and
  a processing circuit coupled to the communications interface, the processing circuit comprising:
    an actual state module that uses the measured value to determine an operating value for a variable that affects a capacity of the HVAC equipment at the actual operating conditions;

a gain module that uses the operating value to calculate a gain factor for the variable relative to design conditions;

a capacity gain module that uses the calculated gain factor to determine a capacity gain for the HVAC equipment relative to the design conditions;

a capacity limit updating module that applies the capacity gain to a design capacity limit for the HVAC equipment to determine a new capacity limit for the HVAC equipment at the actual operating conditions; and an equipment selection module that uses the new capacity limit as a constraint in an optimization routine that selects one or more devices of the HVAC equipment used to achieve a load setpoint.

19. The adaptive capacity constraint management system of claim 18, wherein determining the capacity gain comprises combining a plurality of gain factors for individual variables that affect the capacity of the HVAC equipment to determine a total capacity gain.

20. The adaptive capacity constraint management system of claim 18, wherein:

the optimization routine optimizes an amount of power consumed by the one or more devices of the HVAC equipment to achieve the load setpoint; and the amount of power consumed by the one or more devices in achieving the load setpoint subject to the new capacity limit is less than an optimal amount of power consumed by the one or more devices in achieving the same setpoint subject to the design capacity limit.

* * * * *